(12) United States Patent
Salvino et al.

(10) Patent No.: US 12,226,735 B1
(45) Date of Patent: Feb. 18, 2025

(54) IONIZED GAS SEPARATION ARRANGEMENT

(71) Applicants: Chris Salvino, Scottsdale, AZ (US); Andrew Dummer, Chapel Hill, NC (US); Paul A Beatty, Fort Collins, CO (US)

(72) Inventors: Chris Salvino, Scottsdale, AZ (US); Andrew Dummer, Chapel Hill, NC (US); Paul A Beatty, Fort Collins, CO (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/894,605

(22) Filed: Sep. 24, 2024

Related U.S. Application Data

(63) Continuation-in-part of application No. 18/766,818, filed on Jul. 9, 2024.

(51) Int. Cl.
*B01D 59/48* (2006.01)

(52) U.S. Cl.
CPC .......... *B01D 59/48* (2013.01); *B01D 2253/10* (2013.01); *B01D 2256/18* (2013.01); *B01D 2259/814* (2013.01)

(58) Field of Classification Search
CPC ................ B01D 59/48; B01D 2253/10; B01D 2256/18; B01D 2259/814
USPC ........ 250/283; 96/1, 3, 108, 134; 95/28, 127
See application file for complete search history.

(56) References Cited

U.S. PATENT DOCUMENTS

| | | | |
|---|---|---|---|
| 5,168,158 A | 12/1992 | McComas et al. | |
| 7,514,694 B2 | 4/2009 | Stephan et al. | |
| 7,919,758 B2 | 4/2011 | Stephan et al. | |
| 8,330,115 B2 | 12/2012 | Frank | |
| 8,586,915 B2 * | 11/2013 | Correale | H01J 49/0422 |
| | | | 250/281 |
| 9,134,047 B2 | 9/2015 | Black et al. | |
| 9,261,468 B2 | 2/2016 | Bingham et al. | |
| 9,599,729 B2 | 3/2017 | Roscoe et al. | |
| 10,222,121 B2 | 3/2019 | Cullinane et al. | |
| 11,624,542 B2 | 4/2023 | Sung | |
| 12,005,391 B2 * | 6/2024 | Boscoboinik | B01J 20/28042 |
| 2004/0004184 A1 * | 1/2004 | Schubert | B01D 59/34 |
| | | | 250/284 |

(Continued)

OTHER PUBLICATIONS

Rice, Development of Lunar Ice/Hydrogen Recovery System Architecture, Jan. 1, 2000, p. 36, NIAC, Madison, WI.

*Primary Examiner* — Frank M Lawrence, Jr.
(74) *Attorney, Agent, or Firm* — Kenneth Altshuler

(57) ABSTRACT

Disclosed is a gas separation arrangement for separating and containing various types of gas from a collection chamber based on their different atomic masses. The chamber is connected to an ion diverter via a valve that when open permits the various types of gas to migrate from the collection chamber to an ionizer where the gas is ionized. The ionized gas is accelerated through an ion accelerator and dispensed into an ion deflector. The ion deflector comprises a magnetic field within a channel defined by a pair of split-pole magnets. The trajectory of the ions is based on the mass of the ions, which separates the ions. Multiple collectors are positioned at different locations on an exit side of the ion deflector to receive the different ions traveling along their respective trajectories.

21 Claims, 14 Drawing Sheets

(56) References Cited

U.S. PATENT DOCUMENTS

| | | | |
|---|---|---|---|
| 2005/0199797 A1* | 9/2005 | Schubert | B01D 59/46 250/283 |
| 2006/0113464 A1* | 6/2006 | Litherland | B01D 59/44 250/288 |
| 2007/0199830 A1* | 8/2007 | Farag | B01D 53/229 205/687 |
| 2009/0114809 A1* | 5/2009 | Hotchkis | B01D 59/44 250/281 |
| 2013/0034198 A1 | 2/2013 | Chandrasekharan et al. | |
| 2023/0411134 A1 | 12/2023 | Ryan et al. | |
| 2024/0035379 A1 | 2/2024 | Grillos, II et al. | |

* cited by examiner

IONIZED GAS SEPARATION ARRANGEMENT

CROSS-REFERENCE TO RELATED APPLICATIONS

This continuation-in-part application which claims priority to and the benefit of U.S. patent application Ser. No. 18/766,818 entitled: CRYOGEN CHAMBER WITH ADSORBER, filed on Jul. 9, 2024, the entire disclosure of which is hereby incorporated by reference.

BACKGROUND OF THE INVENTION

1. Field of the Invention

The present invention relates generally to mining extraterrestrial sites for gas trapped in extraterrestrial soil.

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to mining extraterrestrial sites for gas trapped in extraterrestrial soil.

In that light, certain embodiments of the present invention envision a gas separation arrangement that is generally directed to an ion diverter that is used to segregate and capture the segregated gas from an adsorption gas capturing chamber (chamber). The arrangement can comprise a chamber containing at least a first species of gas. The chamber is connected to an ion diverter via a gas transmission port. The ion diverter generally comprises a valve configured to control gas communication between the ion diverter and the chamber. The ion diverter includes an ionizer adjacent to the gas transmission port, an ion deflector comprising a first magnet plate separated from a second magnet plate by a separation spacing defining a channel, and an ion accelerator between the ionizer and the ion deflector. A plurality of target receptacles is disposed at an exit location of the channel, wherein each target receptacle corresponds to a different target gas. The ionizer is configured to ionize the first species of gas and the second species of gas received from the gas transmission port. The ion deflector is configured to direct the ionized first species of gas in a first controlled trajectory from the ion accelerator to the first target receptacle and the ionized first species of gas in a second controlled trajectory from the ion accelerator to the second target receptacle.

Another embodiment of the present invention envisions a gas separator comprising a gas transmission port that is interposed between an ionizer and a chamber, wherein the chamber is configured to contain a first species of gas and a second species of gas. Connected to the chamber and ionizer is an ion deflector that comprises a pair of magnetic plates, which are separated by a channel. There is an accelerator between the ionizer and the ion deflector and a valve configured to control gas communication between the chamber and the ionizer. There is a first and a second target receptacle and disposed at a first and a second exit location, respectively, of the channel. The ionizer is configured to ionize the first species of gas that is received from the gas transmission port and further configured to ionize the second species of gas received from the gas transmission port. The accelerator is configured to accelerate the ionized first species of gas and the ionized second species of gas towards the ion deflector. The ion deflector is configured to deflect the ionized first species of gas in a first curved trajectory between the accelerator and the first target receptacle and is configured to deflect the ionized second species of gas in a second curved trajectory between the accelerator and the second target receptacle.

Yet another embodiment of the present invention envisions a gas separator device comprising a gas transmission pathway having a second part and a first part that extends from a chamber through a gas transmission port before reaching an ionizer and ion accelerator, after which (the ion accelerator) the second part is arched through a magnetic field before terminating at a target receptacle. The chamber is configured to contain a first gas species. The ionizer is configured to ionize the first gas species. The accelerator is configured to accelerate the ionized first gas species towards the magnetic field. The magnetic field is established between a pair of separated magnetic plates, wherein the magnetic field is configured to bias the ionized first gas species along the second part to the target receptacle, which is configured to trap the ionized first gas species.

Still another embodiment of the present invention contemplates a method comprising providing a chamber that is connected to an ion diverter. The method further envisions flowing a first gas species and a second gas species from the chamber to the ion diverter via a gas transmission port, followed by ionizing the first gas species and the second gas species in an ionizer, followed by accelerating the ionized first gas species and the ionized second gas species, via an ion accelerator, into a magnetic field generated by a pair of spaced apart magnetic plates and. The ionized first gas species is biased in a first arc, via the magnetic field, to a first target receptacle and the ionized second gas species is biased in a second arc, via the magnetic field, to a second target receptacle. The ionized first gas species is directed to and captured in the first target receptacle and the ionized second gas species is directed to and captured in the second target receptacle.

Other embodiments of the present invention envision a gas collection system generally comprising a gas segregation chamber, at least one cooling plate in the gas segregation chamber, an adsorption gas capturing chamber connected to the gas segregation chamber and a carbon adsorber in the adsorption gas capturing chamber. The gas segregation chamber comprises a housing, wherein the housing is defined by housing sides that extend from a top housing surface to a rim. A first interior environment is defined within the housing, wherein the first interior environment is in communication with an external environment through only the rim. The external environment being defined outside of the housing. At least one cooling plate is in the gas segregation chamber, wherein the least one cooling plate comprises a passageway that is configured to accommodate cryogenic fluid. An adsorption gas capturing chamber is connected to the housing, wherein the adsorption gas capturing chamber comprises a second interior environment that is in communication with the first interior environment via a connecting port. A carbon adsorber is in the second interior environment.

In another aspect of the present invention, some embodiments envision a gas collection arrangement that generally comprises a gas segregation chamber, at least one cooling plate in the gas segregation chamber, an adsorption gas capturing chamber and a carbon adsorber. The gas segregation chamber defines a first interior environment when a rim of the gas segregation chamber rests atop regolith. The gas segregation chamber also comprises at least one cooling plate that is configured to capture higher temperature condensing gas but not low temperature condensing gas, wherein the gases are released from the regolith. The adsorption gas capturing chamber defines a second interior environment that is in communication with the first interior environment via a connecting port. The carbon adsorber is in the second interior environment, wherein the carbon adsorber is configured to capture the low temperature condensing gas.

Another embodiment of the present invention contemplates a segregating gas arrangement generally comprising a gas segregation chamber, at least one cooling plate in the gas segregation chamber, at least one cooling plate in the gas segregation chamber, and a carbon adsorber. The gas segregation chamber comprises a rim that when resting atop regolith defines a first interior environment. The at least one cooling plate is in the gas segregation chamber, wherein the least one cooling plate is maintained at a first temperature above 5° K, which is a condensation temperature at which higher temperature condensing gases condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

Cartain other embodiments of the present invention envision a gas segregating method comprising providing a segregating gas arrangement comprising an adsorption gas capturing chamber that is connected to a gas segregation chamber. The gas segregation chamber comprises a housing that is defined by housing sides that extend from a top housing surface to a rim. The method further comprises resting the rim atop regolith, wherein a first interior environment is defined within the housing when the rim is resting atop the regolith. A first temperature above 5° K is maintained in at least one cooling surface that is disposed in the gas segregation chamber. A majority of higher temperature condensing gases are condensed in the first interior environment but not a lower temperature condensing gas is not condensed in the first interior environment. The lower temperature condensing gas is captured in a carbon adsorber that is located in the adsorption gas capturing chamber, wherein the lower temperature condensing gas migrates from the first interior environment to a second interior environment that is defined within the adsorption gas capturing chamber.

DETAILED DESCRIPTION

Figure 1A:
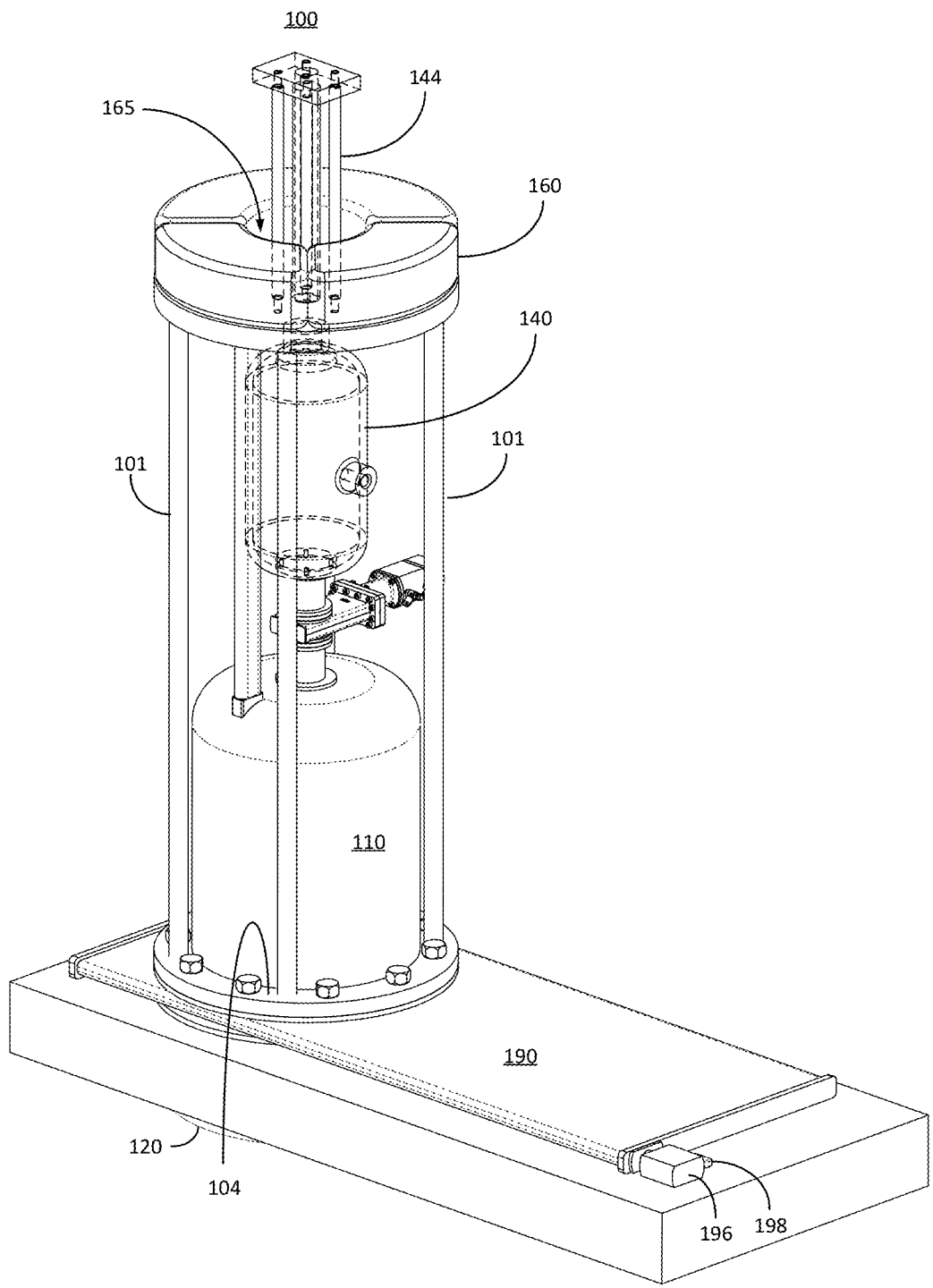
FIGS. 1A and 1B are line drawings of isometric views of the gas capturing arrangement depicting the base open and closed consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/-value assigned to "essentially", then assume essentially means to be within +/-2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting vaporize gaseous atoms and molecules in an extremely low-pressure environment and collecting those vaporize gaseous atoms and molecules using cryogenically cooled surfaces, such as plates. Extremely low-pressure environment is defined herein as below $1 \times 10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3, a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to gas vaporizing temperatures defined as temperatures that are high enough to liberate/vaporize these target gaseous materials from moon regolith, or simply "regolith". The vaporized target gaseous materials are then collected as liquid from condensation surfaces that are at or below the condensation temperatures corresponding to each of the target gaseous materials. When condensed i.e., liquefied, the liquid or frozen, which improves the transportation of these target materials.

In that light, embodiments of the present invention contemplate a vapor collection system that segregates higher temperature condensing vapor, such as hydrogen, oxygen, and nitrogen, from lower temperature condensing vapor, such as helium, that can be used at an extra-terrestrial body to collect target gaseous atoms and molecules that are floating around in a shielded environment at a pressure at or less than $1 \times 10^{-5}$ bar.

Presented below are embodiments of a segregating gas arrangement that generally comprises a gas segregation chamber, at least one cooling plate in the gas segregation chamber, and a carbon adsorber in an adsorption gas capturing chamber. The gas segregation chamber has a rim that when resting atop regolith defines a first interior environment. The cooling plates are in the gas segregation chamber, wherein the cooling plates are maintained at a first temperature above 5° K, which is a condensation temperature that higher temperature condensing gases will condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

Figure 1B:
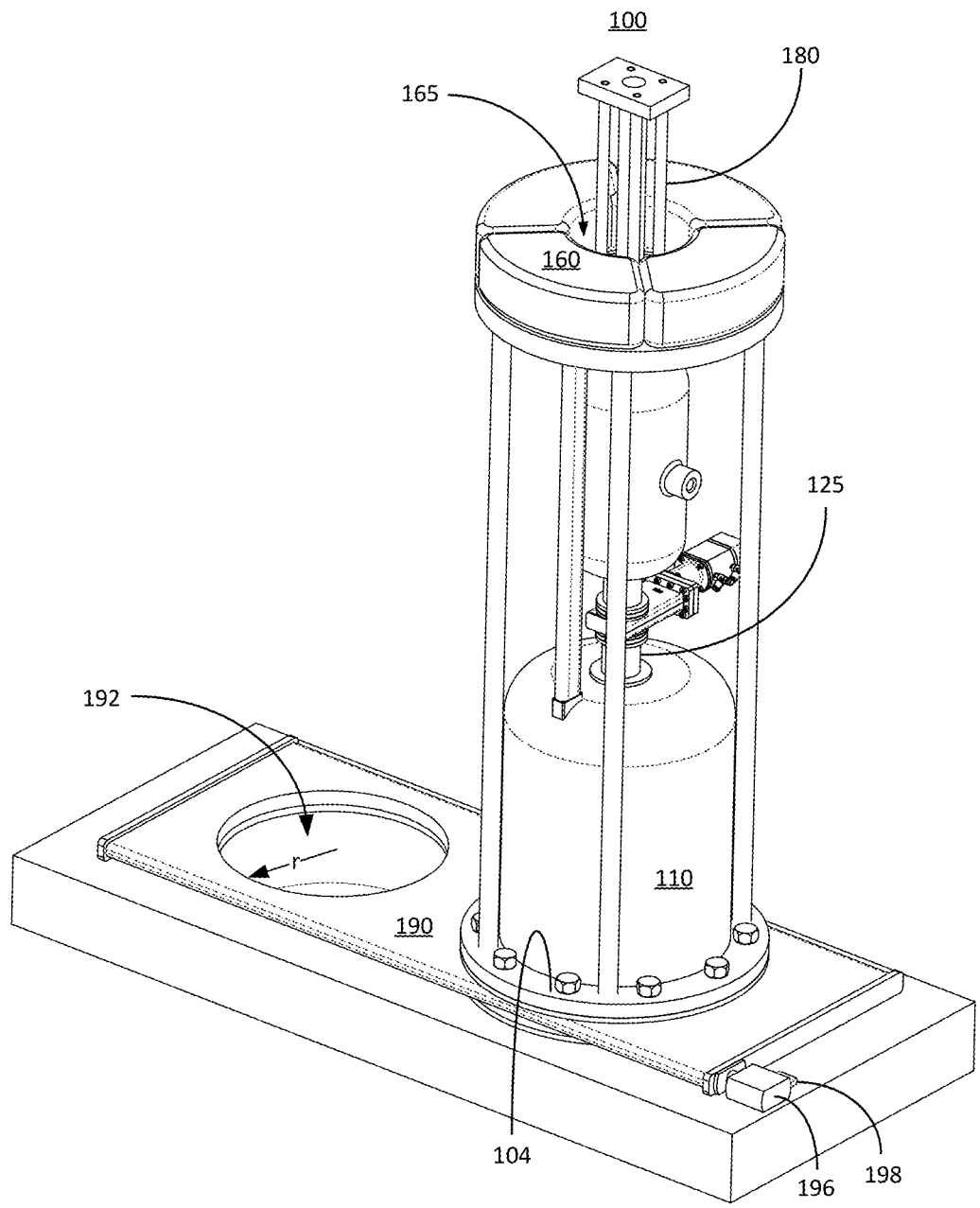

With respect to FIGS. 1A and 1B, the reservoir 160 is shown connected to and supported by the gas capturing arrangement base 104 via support legs 101, however a skilled artisan will immediately appreciate that there are numerous other ways of supporting a reservoir 160 to the gas capturing arrangement 100 without departing from the scope and spirit of the present invention. The carbon adsorber 145 and in some cases the entire adsorption gas capturing chamber 140 can be removed by an adsorber access arm 180 via an access port 165 in the reservoir 160, which would be done after the upper gate valve 124 closes off the connecting passageway 125. A sliding gas segregation chamber gate valve gate 190 (door) is interposed between the gas capturing arrangement base 104 and a rim 120 that is arranged and configured to rest atop a granular surface 200, such as regolith. The sliding gas segregation chamber door 190 comprises an inlet aperture 192 that is aligned with an intake port 121 defined as the space within the inside boundary of the rim 120. The sliding gas segregation chamber door 190 can be actuated by a motor 196 that can be electrically connected to a power source (not shown) via an electrical connector 198. It should be appreciated that though motors, electronics, computers, algorithms may not be shown, such elements can be employed to enhance the functionality of the embodiments described below, however their absence does not change the fundamental functionality of the embodiments to enable the reader to appreciate the scope of the ideas presented herein.

Figure 1C:
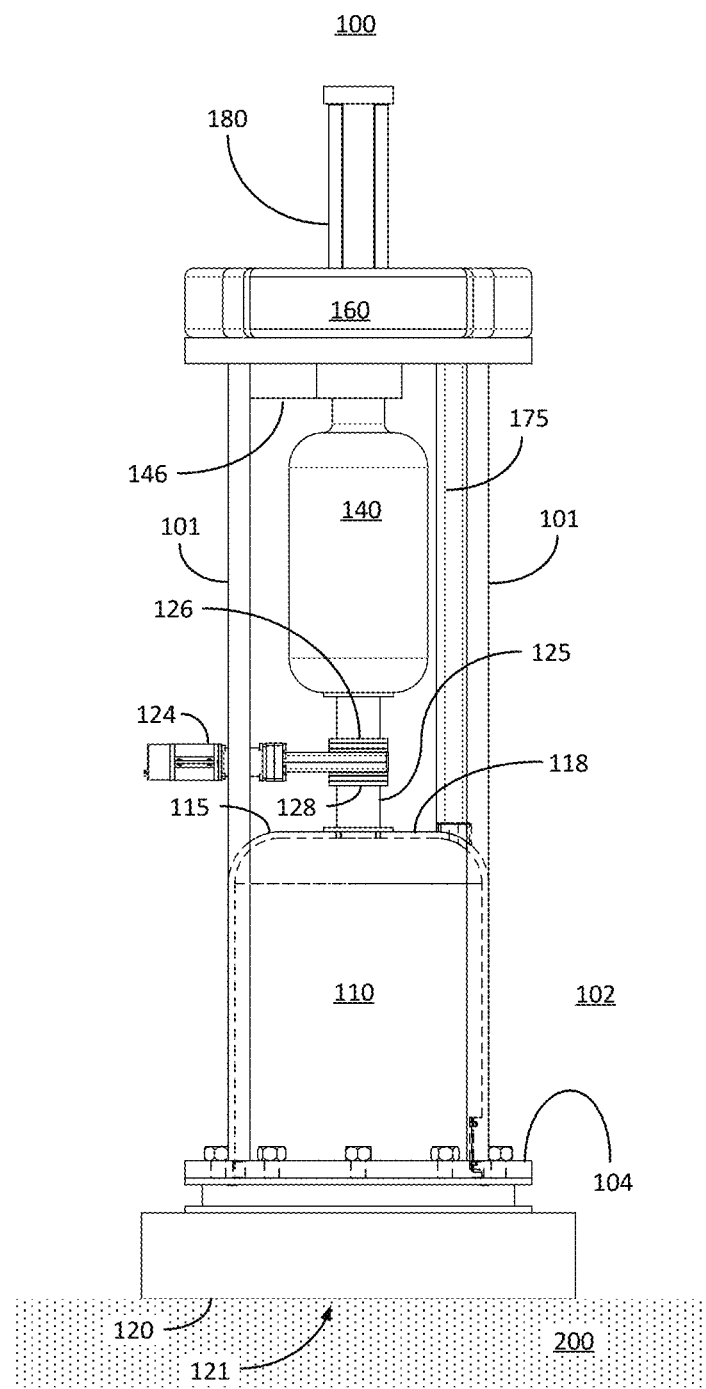
FIG. 1C is a line drawing of a side view of the gas capturing arrangement consistent with embodiments of the present invention.
Figure 1D:
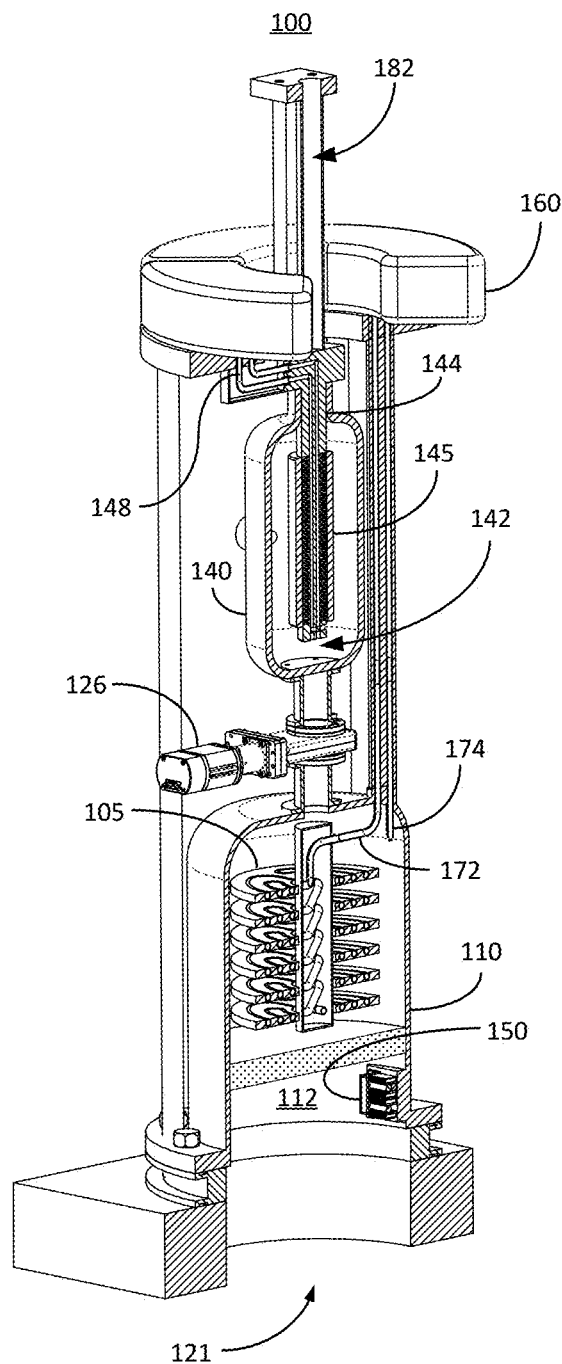
FIG. 1D is a pseudo cross-section line drawing of the gas capturing arrangement consistent with embodiments of the present invention.
Figure 1E:
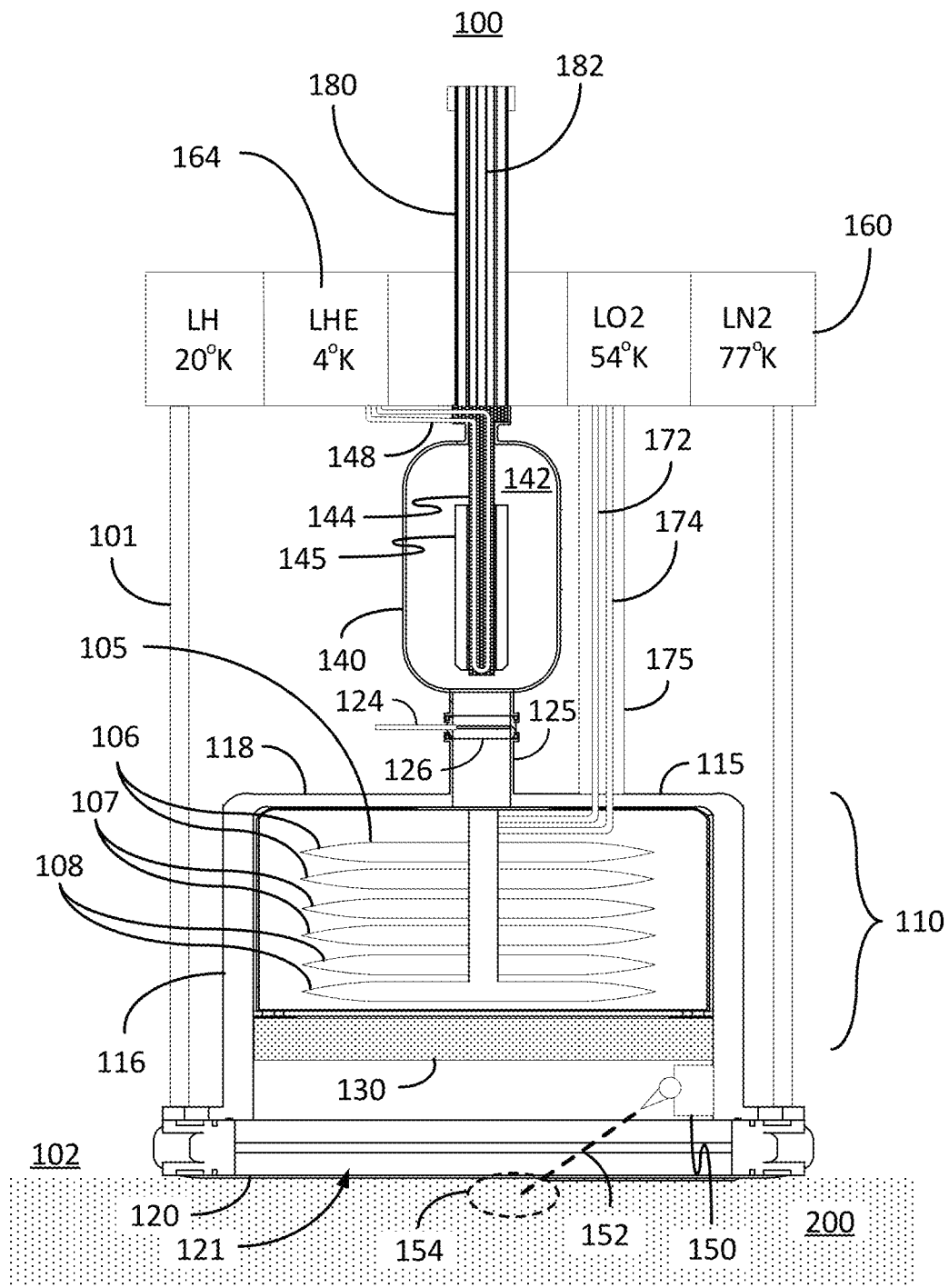
FIG. 1E is a line drawing of a side view cross-section of the gas capturing arrangement from the side view of FIGS. 1C and 1D consistent with embodiments of the present invention.

As shown in FIG. 1C in view of FIGS. 1D and 1E, the gas capturing arrangement 100, and more particularly, the rim 120 is resting on or otherwise in contact with regolith 200. The gas segregation chamber gate valve 190 is open providing communication between the internal segregation chamber environment 112 and the regolith 200 via the inlet region 121, as shown in FIG. 1B. The adsorption gas capturing chamber 140 is connected to the top housing surface 118 of the gas segregation chamber 110 via the connecting passageway 125. The gate 124 of the upper gate valve 126 is open thereby providing communication between the internal segregation chamber environment 112 and the adsorption gas capturing chamber environment 142. When the upper gate valve 126 is closed, the adsorption gas capturing chamber 140 can be separated from the gas segregation chamber 110 at the separation junction 128. The adsorption gas capturing chamber 140 can be lifted from the gas segregation chamber 110 through the access port 165 in the reservoir 160 via the adsorber access arm 180. Liquid cryogen is delivered from the reservoir 160 to the gas segregation chamber 110 via lines in the feed and return line conduit 175 and to the upper chamber heat sink 144 via the lines in upper chamber conduit 146. In the present embodiment, the cryogenic liquid coolant reservoir 160 is held in place relative to the base 104 via the support legs 101.

FIG. 1D is a pseudo cross-section line drawing of the gas capturing arrangement 100 consistent with embodiments of the present invention. Notably, the adsorber 145 is shown in the upper chamber 140. The adsorber 145 is wrapped around and in contact with a heat sink 144, such as a copper block, that is cryogenically cooled by liquid cryogen circulated through feed and return lines 148, the liquid cryogen contained in the cryogenic liquid coolant reservoir 160. The gate valve 126 is configured to close off or open gas communication between the upper and lower chambers 140 and 110. Gas communication is defined as the ability of gas to move from one element or location into another. Cryogenic feed line 172 provides liquid cryogen to the cooling plates 105 in the gas segregation chamber 110 where gas liberated from regolith 200 (via a heater 150 heating the regolith 200) entering the internal segregation chamber environment 112 via the inlet region 121. The liquid cryogen is provided by the cryogenic liquid coolant reservoir/s 160 and circulated through the cooling plates 105 via the feed and return lines 172 and 174.

FIG. 1E is a block diagram of the gas capturing arrangement 100 of FIG. 1D depicting the cross-section of the gas capturing arrangement 100 consistent with embodiments of the present invention. The gas segregation chamber 110 can be configured and arranged like a cryopump with one or more plates 105 that separate out certain types of gases released from the regolith 200 from entering the upper chamber 140. In some embodiments, select gas types can enter the upper chamber, such as H-1, H-2, He-3, He-4, for example.

With more specificity, one embodiment contemplates a plurality of plates 105 with an upper first plate or plates 106 being at a first temperature, a middle second plate or plates 107 maintained at a second temperature, and a lower third plate or plates 108 maintained at a third temperature. This embodiment contemplates the option of the first temperature being colder than the second temperature, the second temperature being colder than the third temperature. In other words, the plates 105 get progressively colder as they near the top housing surface 118. The first temperature can be maintained by pumping a first cryogenic fluid through lines in the first plate or plates 106. The second temperature can be maintained by pumping a second cryogenic fluid through lines in the second plate or plates 107. The third temperature can be maintained by pumping a third cryogenic fluid through lines in the third plate or plates 108. Certain embodiments contemplate the first cryogenic fluid being liquid helium, the second cryogenic fluid being liquid hydrogen, and the third cryogenic fluid being liquid nitrogen.

Another embodiment contemplates one or more plates 105 in the gas segregation chamber 110 being infused with a third cryogenic fluid at a third temperature to segregate out a first gas, such as water vapor, that will condense and freeze on the surface of the one or more plates 105. After a first period of time that is sufficient to segregate out the first gas, the one or more plates 105 can be infused with a second cryogenic fluid at a second temperature to segregate out a second gas, such as nitrogen, that will condense on the surface of the one or more plates 105. After a second period of time that is sufficient to segregate out the second gas, the one or more plates 105 can be infused with a first cryogenic fluid at a first temperature to segregate out a third gas, such as oxygen and hydrogen, that will condense on the surface of the one or more plates 105. The first cryogenic fluid is colder than the second cryogenic fluid, which is colder than the third cryogenic fluid. Certain embodiments contemplate the first cryogenic fluid being liquid helium, the second cryogenic fluid being liquid hydrogen, and the third cryogenic fluid being liquid nitrogen.

Yet another embodiment contemplates the one or more plates 105 in the gas segregation chamber 110 being infused with a single cryogenic fluid, such as liquid helium, that is configured to segregate all gasses out of the gas segregation chamber 110 except helium. In this embodiment, the one or more plates 105 can be maintained at a temperature slightly above the condensation temperature of helium, such as via heat boosts or design of the cryogenic fluid carrying passageways 122 in the cooling plates 105.

The gas segregation chamber 110 is defined within a segregation chamber housing 115. The segregation chamber housing 115 is defined by housing sides 116 that extend from a top housing surface 118 to a rim 120. The segregation chamber housing 115 defines an internal environment 112, which is in communication with an external environment 102 via an inlet region 121 at the rim 120 when the lower gate valve 190 is open. The inlet region 121 is an opening that spans that the rim 120. For example, if the rim 120 is circular with a radius r, the inlet region 121 is the area of the circle ($\pi r^2$). This assumes the inlet aperture 192 in the lower gate valve 190 is open or otherwise not obstructing the inlet region 121. The external environment 102 is defined outside of the housing 115.

The rim 120 is configured and arranged to rest atop a granular surface 200, such as regolith. There can be a filter 130 that is configured to trap regolith dust from entering the internal environment 210 via the inlet region 121. The filter 130 can be a HEPA filter or ULPA filter, for example. Certain embodiments envision to filter but rather the use of magnets with or without ionizers to electromagnetically prevent the regolith dust from entering the internal segregation chamber environment 112.

The gas capturing arrangement 100 can further comprise a heating element 150 configured to emit energy 152 that heats a target volume 154 of regolith 200 at and beyond the rim 120. The heating element 150 can be a laser that emits a laser beam, an ultrasound generator that emits ultrasound, a microwave generator that emits microwaves, a radiant heater that emits radiant heat, etc. When the regolith 200 is heated, gaseous elements are liberated and captured within the gas segregation chamber 110. Some embodiments envision the heating element not being in the gas segregation chamber 110 but rather outside of the gas segregation chamber 110, wherein the externally located heating element directs heat in the regolith 200 under the gas segregation chamber 110.

The adsorption gas capturing chamber 140 is attached to the gas segregation chamber 110 via a connecting passageway 125, which provides communication between the two chambers 110 and 140. In this embodiment, communication can be broken between the internal segregation chamber environment 112 the adsorption gas capturing chamber environment 142 via the gate valve 126 when the gate 124 is closed. Certain embodiments contemplate the adsorption gas capturing chamber 140 being detachable from the gas segregation chamber 110, such as for example at the gate valve 126. Other embodiments contemplate the adsorption gas capturing chamber 140 being directly attached to the gas segregation chamber 110 (that is with no connecting passageway 125 therebetween).

With respect to the adsorption gas capturing chamber 140, disposed therein is a carbon adsorber 145 configured and arranged to capture isolated gas that is not targeted to be captured in the gas segregation chamber 110. The carbon adsorber 145 is comprised of a highly porous carbon that is well known for having a high surface area due to its high porosity. Certain embodiments envision capturing the isolated gas that migrates into the adsorption gas capturing chamber 140 in the pores of the carbon adsorber 145. In the present embodiment, the carbon adsorber 145 is in contact with a heat sink 142, which is maintained at or near the cryogenic temperature of the cryogenic fluid circulating therethrough via the upper chamber cryogen feed and return lines 148. The heat sink 142 is a body at essentially the lowest temperature in the gas capturing arrangement 100. The upper chamber heat sink 144 cools the carbon adsorber 145 by way of conduction to near the temperature of the heat sink 142, within a degree or two Kelvin.

The adsorption gas capturing chamber 140 is connected to an adsorber access arm 180 that can assist in removing the adsorption gas capturing chamber 140 from the gas capturing arrangement 100. Certain embodiments envision a duct 182 inside of the adsorber access arm 180 configured to pull gas collected in the carbon adsorber 145 for storage and transport via a secondary gas receiving system (not shown).

Figure 2A:
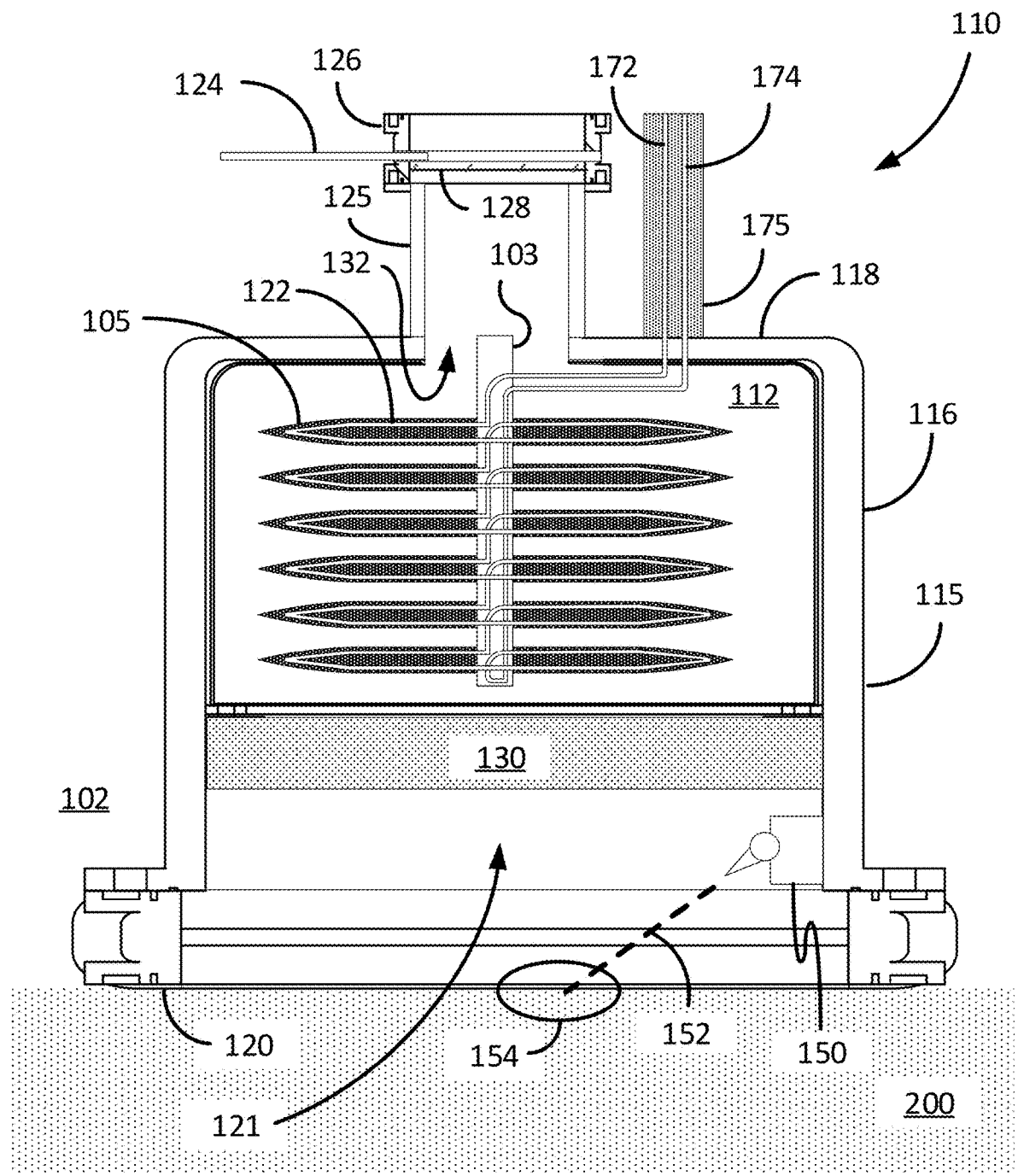
FIG. 2A is a line drawing of a cross-section view of the gas segregation chamber consistent with embodiments of the present invention.

FIG. 2A is a line drawing of a cross-section view of the gas segregation chamber 110 consistent with embodiments of the present invention. FIG. 2A is in view of FIG. 1C identifying associated elements called out. In this embodiment, there are six cooling plates 105 attached to one another via a stem 103 extending through the center of the cooling plates 105. The stem 103 can attach to the segregation chamber housing 115 via a web or spokes, not shown, which permit unobstructed movement of gas from the gas segregation chamber 110 into the adsorption gas capturing chamber 140 via the connecting passageway 125. Each of the cooling plates 105 comprise cryogenic fluid carrying passageways 122 through which cryogenic fluid is circulated from the feed line 172. The cryogenic fluid carrying passageways 122 ultimately loop back to the cryogenic fluid coolant reservoirs 160 via the return line 174. The feed line 172 and return line 174 are shielded by a feed and return line conduit 175. The cryogenic fluid is circulated through the cryogenic fluid carrying passageways 122 in the cooling plates 105 to bring the temperature of the cooling plates to below the condensation temperature of one or more target gasses in the internal segregation chamber environment 112. In the present embodiment, the cooling plates 105 are disk shaped but other embodiments contemplate other shapes, such as blades, rectangles, etc., without departing from the scope and spirit of the present invention. The gas segregation chamber 110 is considered a cryogenic 'roughing pump' to segregate out a majority of higher temperature condensing gasses from the lower temperature condensing gases before the lower temperature gasses migrate into the adsorption gas capturing chamber 140.

In practice, the heating element 150 heats the regolith 200 to a temperature above which will liberate gasses trapped in the regolith 200. The liberated gasses (of which there may be several different types, such as hydrogen, oxygen, helium, nitrogen, argon, etc.) enter the internal segregation chamber environment 112 via the inlet region 121 (when open) defined as either the area within the rim 120 or the area of the inlet aperture 192, whichever is smaller. In some embodiments, the inlet area within the rim 120 is the same as the area of the inlet aperture 192. The heating element 150 can diffuse energy to the surface of the regolith 200. The energy can be radiant energy, microwave energy, ultrasonic energy, conductive energy from a contact heater, or a laser that sweeps over an area under the area within the rim 120, just to name several non-limiting examples. In this embodiment a filter 130 interposed between the rim 120 and the cooling plates 105 prevents or at the least greatly reduces any dust from entering the internal segregation chamber environment 112 without blocking any gases.

With continued reference to the cooling plates 105, certain embodiments envision the cooling plates 105 being maintained at a temperature that is cold enough to condense out all gasses except for helium. In this case, liquid helium is circulated through the cooling plates 105 to maintain a temperature of the cooling plates 105 slightly above the condensation temperature of helium. In this way, helium is segregated from the other gases and will migrate through the connecting passageway 125 and into the adsorption gas capturing chamber 140, assuming the upper gate valve 126 is open. Meanwhile, the cooling plates 105 will, condensed water, oxygen, nitrogen, hydrogen, etc. hence the roughing pump portion of the gas collection arrangement 100. The valve 126 can be closed and the adsorption gas capturing chamber 140 can be separated at separation junction 128 for processing the contents of each chamber 110 and 140 remotely or on-site.

Certain other embodiments envision multiple different kinds of cryogenic fluid at different temperatures either made to flow through the cooling plates 105 successively to provide a successively colder internal segregation chamber environment 112 as discussed above. For example, liquid nitrogen can be made to flow through the cooling plates 105 first, followed by liquid oxygen, then liquid hydrogen and lastly followed by liquid helium. Another embodiment envisions the bottom two cooling plates 105 being maintained at a temperature that condenses water, the middle two cooling plates 105 being held at a temperature to condense oxygen and the upper two cooling plates 105 being held at a temperature that condenses hydrogen. This can be accomplished with multiple fluid cryogens or a single cryogen with different geometries of the cryogenic fluid carrying passageways 122 in each set of cooling plates 105 or optionally electric heaters embedded in the cooling plates 105 for temperature control, just to name several examples. The condensate on the cooling plates 105 can be collected and processed for later use. The heaters in the cooling plates 105 can further be used to heat the cooling plates 105 to a temperature the liberates the condensed gas from the plate surfaces for further processing.

Figure 2B:
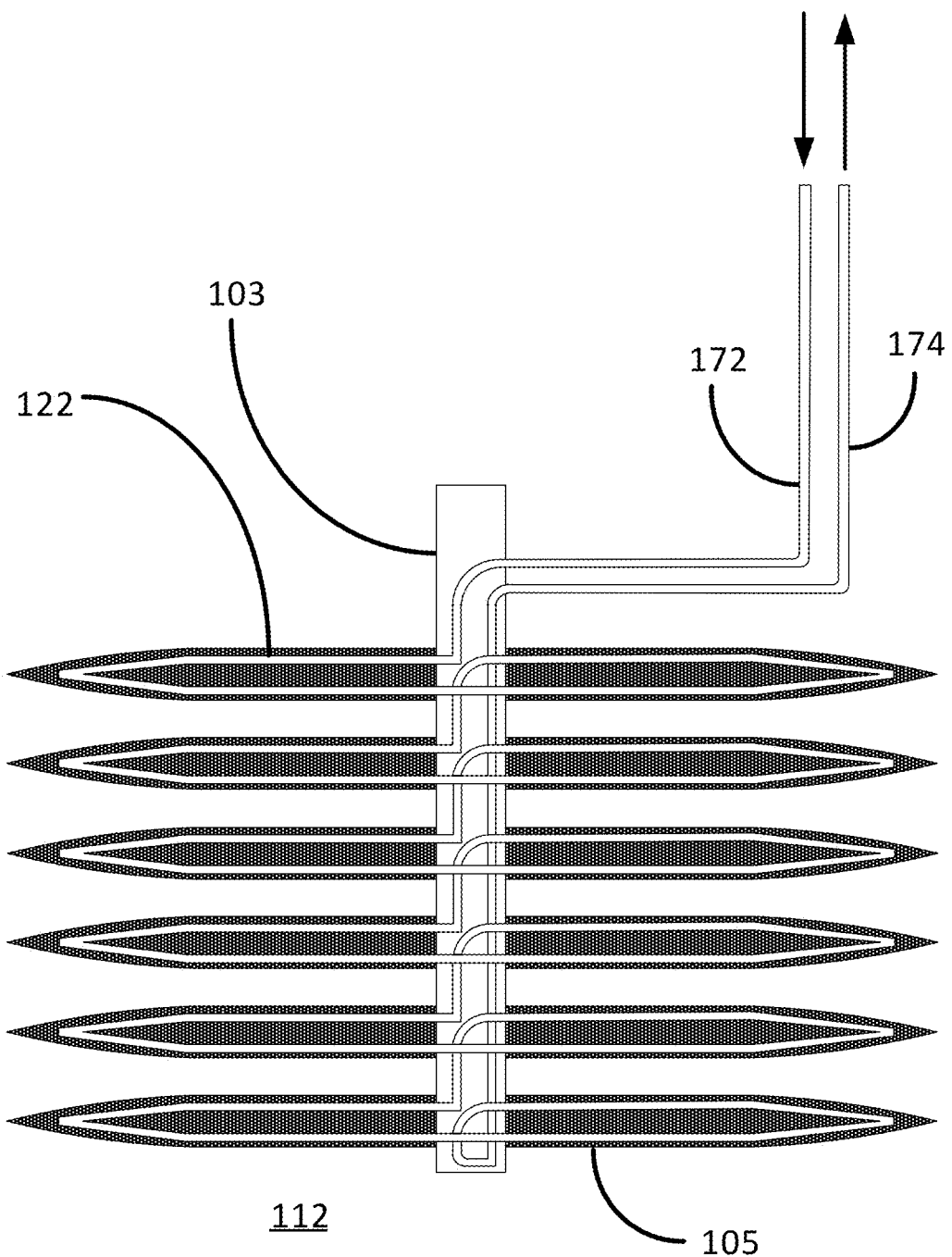
FIG. 2B is a line drawing of a higher resolution cross-section line drawing of the cooling plates consistent with embodiments of the present invention.

FIG. 2B is a higher resolution cross-section line drawing of the cooling plates 105 consistent with embodiments of the present invention. As shown, there is a downward arrow indicating the direction of cryogenic fluid flow in the feed line 172. The feed line 172 connects into each colling plate 105 via the cryogenic fluid carrying passageways 122. In the present embodiment, the cryogenic fluid carrying passageways 122 in each cooling plate 105 connect to one another through the stem 103. The cryogenic fluid carrying passageway 122 in the bottom cooling plate 105 connects to the return line 174 in the stem 103 where it can flow (be pumped) back into the reservoir tank 160, shown by the up facing arrow.

Figure 3:
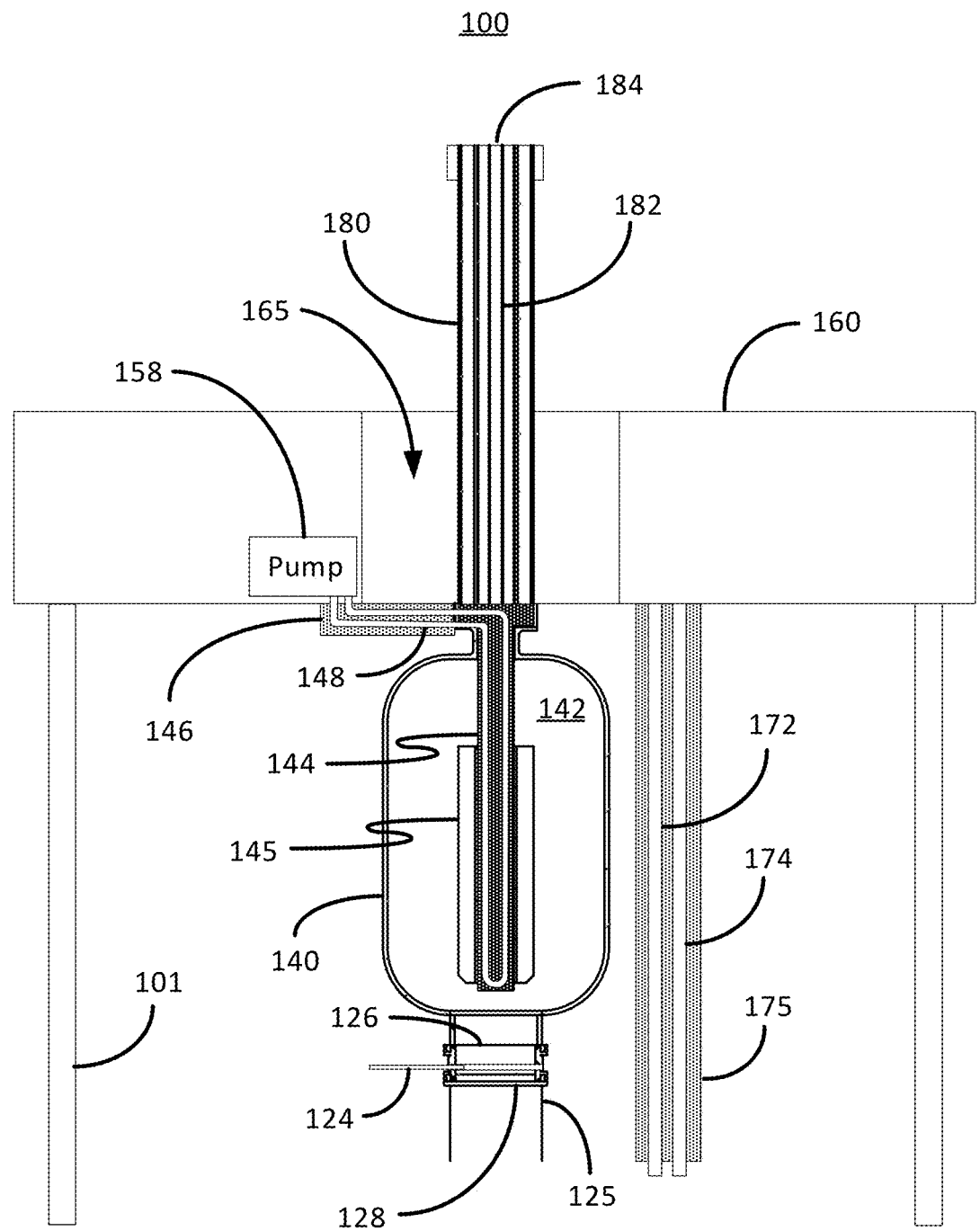
FIG. 3 is a higher resolution cross-section line drawing of the adsorption gas capturing chamber and cryogenic liquid coolant reservoir consistent with embodiments of the present invention.

FIG. 3 is a higher resolution cross-section line drawing of the adsorption gas capturing chamber 140 and cryogenic liquid coolant reservoir 160 consistent with embodiments of the present invention. As shown, a pump 158 disposed in the reservoir 160 is configured to circulate cryogenic liquid coolant through the upper chamber cryogen feed and return lines 148 and in one embodiment the lower chamber cryogen feed line 172 and return line 174. Other embodiments envision a separate pump circulating cryogenic liquid coolant through the lower chamber cryogen feed line 172 and return line 174. The adsorption gas capturing chamber 140 comprises a carbon adsorber 145 that is in contact with the upper chamber heat sink 144. The carbon adsorber 145 is cooled through conduction while the heat sink 144 is being cooled by the cryogen circulating through the upper chamber cryogen feed and return lines 148. In operation, the adsorption gas capturing chamber 140 is envisioned to mostly contain helium gas (as the segregated, targeted gas) since the other gasses liberated from the regolith 200 are mostly condensed in the gas segregation chamber 110. The helium gas contains a concentration of both He-3 and He-4 of which become trapped in the carbon adsorber 145. Because He-3 condenses at around 3° K, the carbon adsorber 145 is kept below that temperature to help retain He-3 and He-4.

The contents of the carbon adsorber 145, such as He-3 and He-4 from the example above, can be harvested by closing the gate valve 126, separating the adsorption gas capturing chamber 140 from the connecting passageway 125 at the separation junction 128, and removing the adsorption gas capturing chamber 140 through the access port 165 in the reservoir 160. Once removed, the adsorption gas capturing chamber 140 can be replaced with a new or ready to use adsorption gas capturing chamber 140. The adsorption gas capturing chamber 140 that has been collecting gas can be processed in a processing facility equipped to harvest or otherwise extract the gas captured in the adsorption gas capturing chamber 140 and the carbon adsorber 145. Optionally, the gas captured in the adsorption gas capturing chamber 140 and the carbon adsorber 145 can be extracted without removing the adsorption gas capturing chamber 140 via the access arm duct 182 extending through the adsorber access arm 180 by connecting an extractor at the access channel 184 at the top of the adsorber access arm 180. In yet another harvesting option, the carbon adsorber 145 is envisioned to be a cartridge that is removable from the adsorption gas capturing chamber 140 and replaceable with a new or ready to use cartridge.

Figure 4:
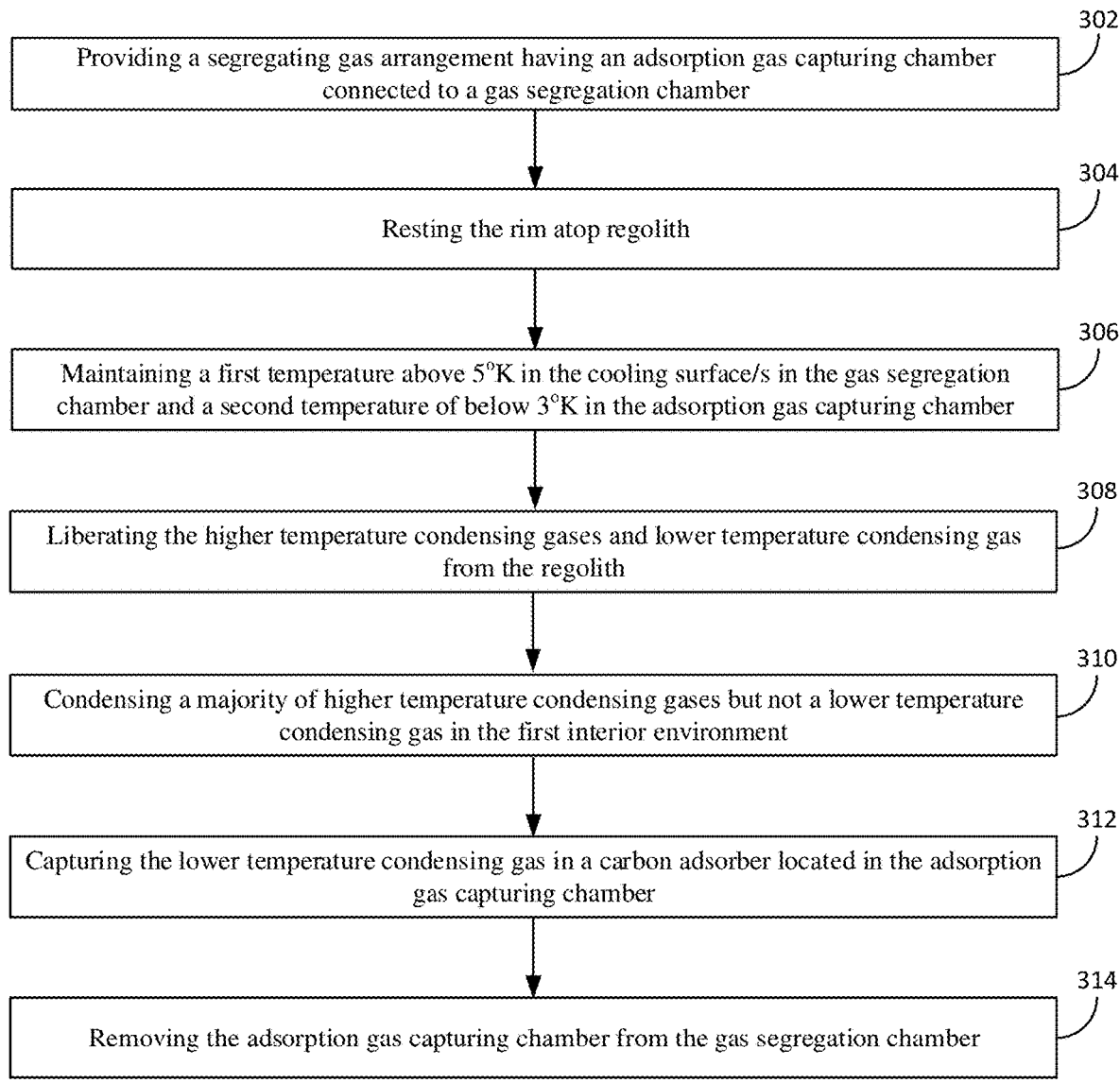
FIG. 4 is a block diagram describing method steps of using the segregating gas arrangement consistent with embodiments of the present invention.

FIG. 4 is a block diagram describing method steps of using the segregating gas arrangement 100 consistent with embodiments of the present invention. FIG. 4 is intended to be seen in view of the preceding figures with the callout numbers corresponding to the elements referred to therein. Step 302 refers to the segregating gas arrangement 100 as described above. Though the adsorption gas capturing chamber 140 is shown connected to the top portion of the gas segregation chamber 110, the adsorption gas capturing chamber 140 can be connected elsewhere. Certain other embodiments envision a single gas segregation chamber 110 (no separate adsorption gas capturing chamber 140) with the carbon adsorber 145 therein using potentially separate temperatures at different times to capture higher condensing temperature gasses then lower condensing temperature gas/es as described herein.

Step 204 is a step for locating the segregating gas arrangement 100 to a spot/location on the Moon or some other extraterrestrial body and resting the rim 120 of the gas segregation chamber 110 atop regolith 200. The positioning could be accomplished with a rover, manually, by a hovering device, or simply by deploying the segregating gas arrangement 100 from an orbiting or hovering craft.

Once deployed with the rim 120 resting on the regolith 200, as shown in step 306, the cooling plates 105 in the gas segregation chamber 110 are brought down to a temperature at or above 5° K, which can be accomplished by circulating liquid helium through channels 122 in the cooling plates 105. The cooling plates 105 are one embodiment of a cooling surface, which could be one or more screens, blades, channels, or some other surface that can be chilled as understood by those skilled in the art. 5° K is the temperature that all higher condensing temperature gasses other than helium will condense, which will essentially segregate or otherwise rough the higher temperature condensing gasses out in the gas segregation chamber 110. This process isolates helium gas (He-3 and He-4) to migrate into the adsorption gas capturing chamber 140 where it can be adsorbed by a carbon adsorber 145 maintained at below 3° K, which is a temperature that helium condenses. In order to accomplish these low temperatures, the liquid helium supplied by the reservoir 160 can be pressurized and further cooled. This process can be adjusted to different temperatures to target specific gasses having a higher condensing temperature than helium, such as targeting hydrogen or something else while roughing out even higher condensing temperature gasses.

As presented in step 308, the gas to be captured within the segregating gas arrangement 100 is liberated from the regolith 200 under the rim 120 via a heater 150 that heats up the regolith 200 to temperatures that may exceed 800° K. The liberated gas enters the interior environment 112 of the gas segregation chamber 110 through an opening (inlet region) 121 in the rim 120. In certain embodiments, the inlet region/opening 121 can be shut via a gate valve 190 to isolate at least the first interior environment 112. When the gate valve 190 is closed, the gases trapped in the gas segregation chamber 110 can be contained for further processing without simply escaping back through the inlet region/opening 121 and into the exterior environment 102.

With the different gasses in the segregating gas arrangement 100, a majority of the higher temperature condensing gasses condense on the cooling plates 105 (step 310) preserving the lower condensing gases, such as helium, to condense in the carbon adsorber 145 (step 312). The carbon adsorber 145 and helium can be isolated from the gas segregation chamber 110 by closing the upper gate valve 126. In this way the carbon adsorber 145 can be removed from the adsorption gas capturing chamber 140 for further processing. Optionally, the adsorption gas capturing chamber 140 can be separated from and entirely removed from the segregating gas arrangement 100 at a junction between the gas segregation chamber 110 and the adsorption gas capturing chamber 140 (step 314). Certain other embodiments envision a mobile gas collector (not shown) going to the segregating gas arrangement 100 and pulling the accumulated helium gas from the adsorption gas capturing chamber 140 via an access arm duct 182 in the adsorber access arm 180 that extends from the adsorption gas capturing chamber 140. In another embodiment, the adsorption gas capturing chamber 140 can be heated to liberate the trapped helium gas in the carbon adsorber 145 when pulling the helium gas via the adsorber access arm 180. A similar technique can be used with the gas segregation chamber 110 to collect the higher condensing temperature gases trapped therein.

Another embodiment of the present invention envisions separating multiple gas species contained within the upper chamber 140 using techniques like that of a mass spectrometer. A mass spectrometer is an apparatus for separating isotopes, molecules, and molecular fragments according to mass. A sample to be analyzed in a mass spectrometer is vaporized and ionized, and the ions are accelerated in an electric field and deflected by a magnetic field into a curved trajectory that gives a distinctive mass spectrum. Mass spectrometry (MS) is an analytical technique that is used to measure the mass-to-charge ratio of ions. In a typical MS procedure, a sample, which may be solid, liquid, or gaseous, is ionized, for example by bombarding it with a beam of electrons. This may cause some of the samples molecules to break up into positively charged fragments or simply become positively charged without fragmenting. These ions (fragments) are then separated according to their mass-to-charge ratio, for example by accelerating them and subjecting them to an electric or magnetic field: ions of the same mass-to-charge ratio will undergo the same amount of deflection. The ions are detected by a mechanism capable of detecting charged particles, such as an electron multiplier. Results are displayed as spectra of the signal intensity of detected ions as a function of the mass-to-charge ratio. The atoms or molecules in the sample can be identified by correlating known masses (e.g. an entire molecule) to the identified masses or through a characteristic fragmentation pattern.

Hence, certain other embodiments of the present invention envision a gas separation arrangement for separating and containing various types of gas from a collection chamber based on their different atomic masses. The chamber is connected to an ion diverter via a valve that when open permits the various types of gas to migrate from the collection chamber to an ionizer where the gas is ionized. The ionized gas is accelerated through an ion accelerator and dispensed into an ion deflector. The ion deflector comprises a magnetic field within a channel defined by a pair of split-pole magnets. The trajectory of the ions is based on the mass of the ions, which separates the ions. Multiple collectors are positioned at different locations on an exit side of the ion deflector to receive the different ions traveling along their respective trajectories.

FIGS. 5A-5E are line drawings of a gas separation arrangement connected to the adsorption gas capturing chamber. FIGS. 5A-5E are described in view of one another, hence elements described in conjunction with the gas separation arrangement 250 may be shown in one or more of the figures. The gas separation arrangement 250 generally comprises an adsorption gas capturing chamber 240 that collects gas trapped in regolith 200 and an ion diverter 251 that segregates or otherwise separates the different types of gas 265 collected in the chamber 240.

Figure 5A:
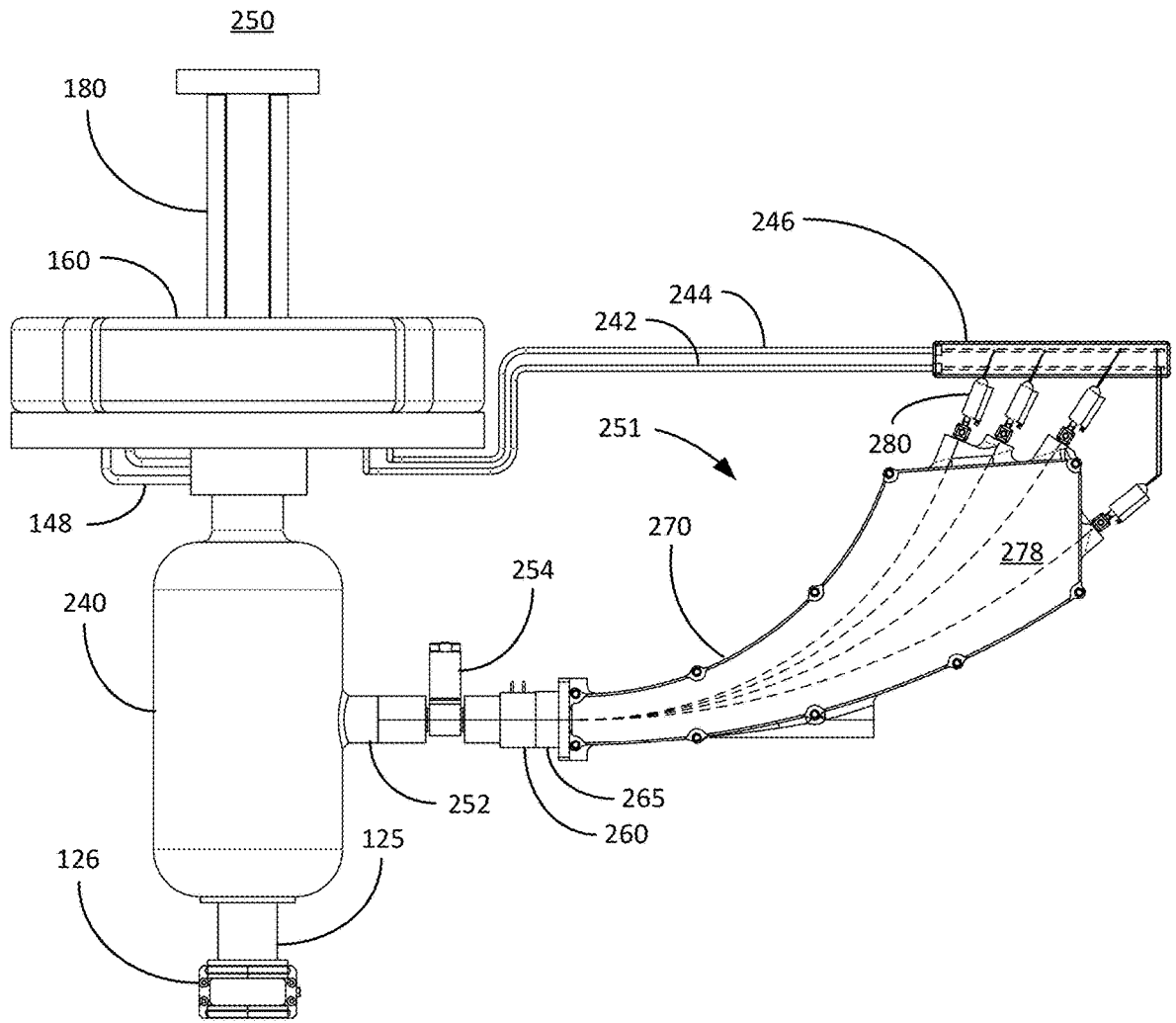
FIG. 5A is a line drawing of the gas separation arrangement connected to the adsorption gas capturing chamber consistent with embodiments of the present invention.

FIG. 5A is a line drawing of the gas separation arrangement connected to the adsorption gas capturing chamber consistent with embodiments of the present invention. The adsorption gas capturing chamber 240 is like the adsorption gas capturing chamber 140 of FIG. 3 but with some minor differences including a gas transmission port 252 extending from the side of the chamber 240. As shown, the chamber 240 can be connected to the lower gas segregation chamber 110 (of FIG. 1C) via the connecting passageway 125 with the option of being shut off from the gas segregation chamber 110 via the gate valve 126. The upper chamber cryogenic feed and return lines 148 are also connected to the cryogenic liquid coolant reservoir embodiment 160. The reservoir additionally feeds cryogenic fluid to segregated gas collecting receptacles (or simply "receptacles") 280, as well as all other cryogen needs of the arrangement 250. Though the adsorber access arm 180 is depicted in this embodiment, some embodiments envision no adsorber access arm 180.

The gas separation arrangement 250 comprises an ion diverter 251 connected to the chamber 240 via the gas transmission port 252. Gas 265 from the chamber 240 feeds the ion diverter 251 via a valve 254 (which in this embodiment is a needle valve but could just as easily be some other kind of valve that regulates the gas flow between the chamber 240 and the ion diverter 251). The valve 254 facilitates the movement of gas 265 from the chamber 240 into the ion diverter 251. The ion diverter 251 generally comprises the ionizer 260, the accelerator 265, a magnetic ion deflector 270 and receptacles 280. The ionizer 260 ionizes the gas 265 received from the chamber 240 and the accelerator 265 accelerates the ionized gas 265 to the receptacles 280 via an ion deflector 270, thus separating the gas 265 by type, which are collected in the individual receptacles 280A-280D. The receptacles 280 can be cryogenically chilled by the cryogenic fluid (from the coolant reservoir 160) circulated the feed and return lines 242 and 244. In this embodiment, there is a cryogenic fluid exchange support housing 246, that provides support for feed and return lines 242 and 244, connected to the receptacles 280.

Figure 5B:
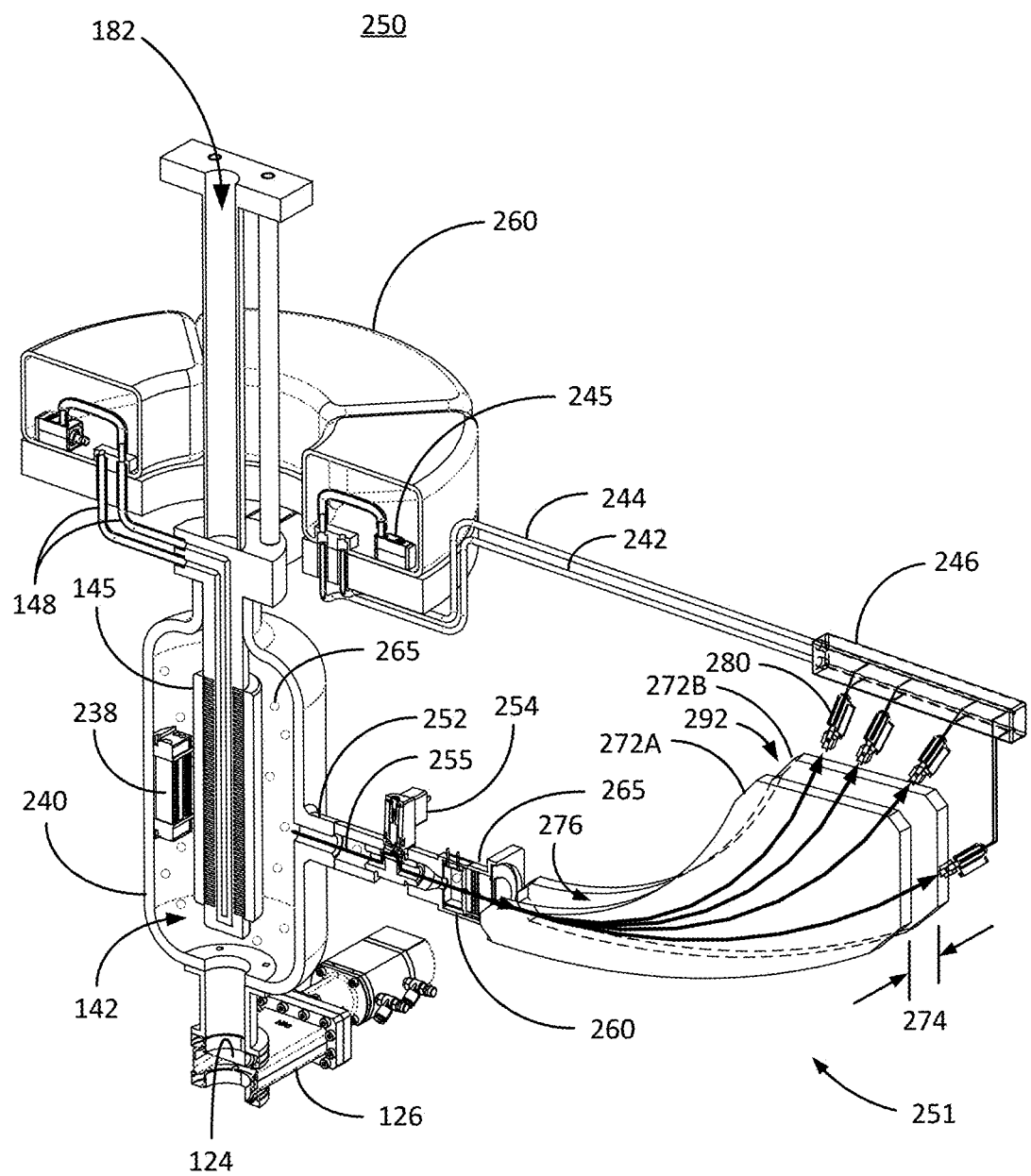
FIG. 5B is a line drawing of a cross-section of the gas separation arrangement depicting the gas transmission pathway in the gas separation arrangement.

FIG. 5B is a line drawing of a cross-section of the gas separation arrangement 250 depicting the gas transmission pathway 255 in the gas separation arrangement 250. Gas 265 from the chamber 240 is under a higher pressure than the pressure on the other side of the needle valve 254 (to the right of the needle valve 254) thereby causing gas 265 to flow to the right along the gas flow pathway 225 depicted with a thicker arrowed line. Past the needle valve 254, the gas 265 from the chamber 240 is ionized in an ion chamber 260 and then accelerated via charged plates 266 (of FIG. 5D) in an accelerator 265. The ionized gas 265 is launched into an entry location 194 (of FIG. 5C) of the channel 276 defined by a spacing 274 between a pair of split-pole magnet plates 272A and 272B, such as permanent magnets. Notably, the two magnet plates 272A and 272B generally comprise the ion deflector 270 because the magnetic field generated between the split-pole magnetic plates 272 (which are oppositely polarized) bend the trajectory of the ions based on the mass of the ions in the same way a mass-spectrometer works. Hence, the trajectory of the lighter ions bends more in the presence of the magnetic field than the heavier ions as shown by the four arrows. The trajectory of each ion type in the presence of the magnetic field is easily predicted, hence the placement of the receptacles 280 at the channel exit location 292 are appropriately placed on the distal end of the split-pole magnet pair 272A and 272B. In this embodiment, the receptacles 280 are cryogenically chilled via liquid cryogen pumped through the cryogen feed and return lines 242 and 244 by the pump 245. Cryogenically cooling the ion traps in the receptacles 280 improves trapping the ions dispensed therein.

With respect to the chamber 240, shown therein is a chamber heater 238 that when turned on liberates the gas 265 trapped in the chamber's carbon adsorber 145. In this embodiment, the liberated gas 265 is trapped in the chamber environment 142 by the gate 124 when the gate valve 126 is actuated shut. Upon opening the needle valve 254, gas 265 can be regulated to flow into the ion diverter 251 where the gas 265 from the chamber environment 142 is ionized and separated and captured in the receptacles 280A-D.

Figure 5C:
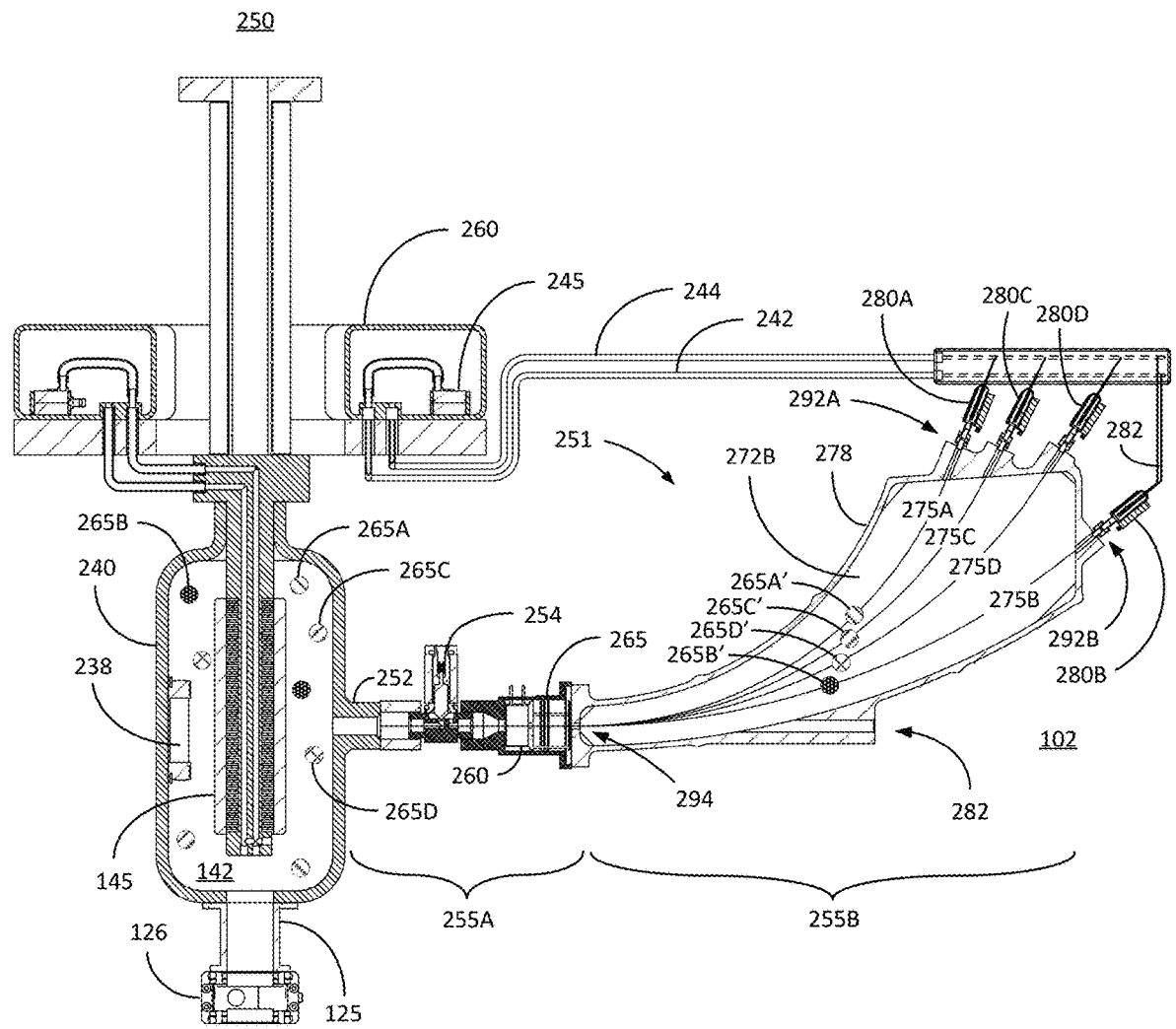
FIG. 5C is a line drawing depicting the gas separation arrangement in a cross-section side view consistent with embodiments of the present invention.

FIG. 5C is a line drawing depicting the gas separation arrangement 250 in a cross-section side view consistent with embodiments of the present invention. Briefly, the gas separation arrangement 250 depicts elements of the adsorption gas capturing chamber 240 and the elements of the ion diverter 251. In general, various gas types 265 that make it into the chamber 240 adsorb in the carbon adsorber 145 (or some other adsorber that is intended to capture or otherwise trap gas 265). The ion diverter 251 separates the type of gas 265A-D, which can then be collected by gas type 265A-D in the receptacles 280A-D.

One embodiment envisions the needle valve 254 being closed while gases that migrate into the chamber 240 are collected in the carbon adsorber 145. Based on some triggering event (such as enough gas 265 that is believed collected in the carbon adsorber 145, or if gas 265 being collected from a location is believed to be depleted from the location, or after a predetermined amount of time, or based on some other external input like a person or computer program making decisions), the gate valve 126 in the connecting passageway 125 is closed, such as by a controller (not shown) operating via a computer program in sync with the rest of the system 250. With the gate valve 126 and the needle valve 254 closed, the chamber heater 238 is turned on (such as by a controller), which heats up the carbon adsorber 145 thereby liberating the gas trapped therein. Accordingly, pressure from the liberated gas builds in the chamber environment 142. With an elevated pressure in the chamber environment 142, the needle valve 254 is opened allowing a controlled amount of the gas 265 to pass through the gas transmission port 252 and into the ionizer 260 by way of the needle valve 254.

Figure 5D:
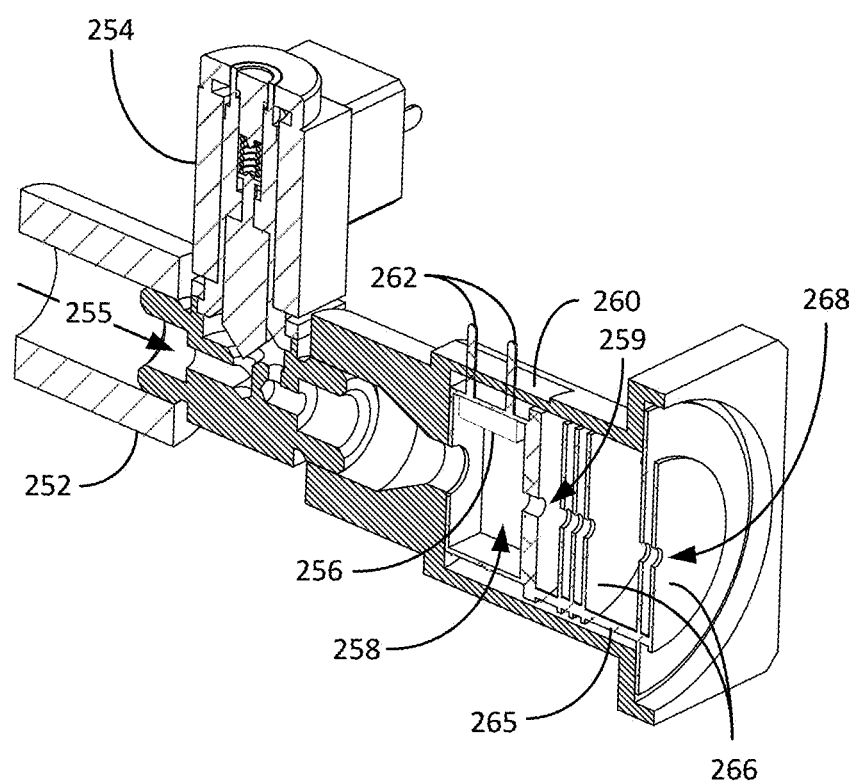
FIG. 5D is a line drawing cross-section of the segment between the chamber and ion diverter consistent with embodiments of the present invention.

As also shown in FIG. 5D, the ionizer 260 has an ionizer region 258 where electrons are emitted (via an electron emitter 256) to bombard the base-particles (gas 265) thus creating ionized gas. The ionized gas is accelerated via an electric field produced by accelerator plates 266 (such as magnets) in the accelerator 265 and directed through the accelerator apertures 268 located in the center of the accelerator plates 266. The accelerated ionized gas 265A'-D' hurls towards the gap/channel 276 in between the split-pole magnets 272A and 272B. The split-pole magnets 272 redirect or otherwise bend the trajectory 275A-D of the ionized gas 265A'-D' in the angled magnet housing 278 in predictable angle β+/−some offset, depending on the mass of the ionized gas 265A'-D'. In this example, there are four ionized gas types 265A'-D' that each have a different mass and therefore a different trajectory 275A-D. For example, the target gases 265A-D that are segregated and collected in this embodiment may consist of H-1 (protium), H-2 (deuterium), He-3, He-4. Their respective trajectories 275A-D are drawn as trajectory H-1 275A, trajectory H-2 275B, trajectory He-3 275C, and trajectory He-4 275D, each of which lead into their respective segregation gas collecting receptacle 280A-D. In other words, the four segregated gas collecting receptacles 280A-D each capture the gas ions 265A'-D' based on ion type, which are dispensed based on the ion mass. The ion diverter 251 further comprises a tailings port 282, which can be used to capture or dispense any other heavier ionized gases into the exterior environment 102. The gas 265 from the chamber 240 travels together along a gas transmission pathway first portion 255A before diverging based on relative mass in a gas transmission pathway second portion 255B between the split-pole magnets 272. Certain embodiments envision that the internal pressure of the channel/gap 276 is essentially the same as the environment external 102 to the channel 276 because the system 250 is being used in an extraterrestrial environment, such as the Moon.

FIG. 5D is a higher resolution line drawing of the elements between the chamber 240 and the ion deflector 170 consistent with embodiments of the present invention. As shown, the gas transmission pathway 255 starts at the gas transmission port 252 and leads into the needle valve 254 where it goes into the ionizer 260. The ionizer 260 comprises a pair of electrical leads 262 that powers an electron emitter 256, which ionizes the gas 265A-D entering in the ionizer chamber/region 258 from the needle valve 254. The ions 265A'-D' enter the ion accelerator 265 via an ionizer-to-accelerator port 259 where the ions 265A'-D' are accelerated through the magnetic accelerator plates 266 in the accelerator 265. The ions 265A'-D' are emitted through the accelerator aperture 268 and into gap/channel 276 between the split-pole magnets 272.

Figure 5E:
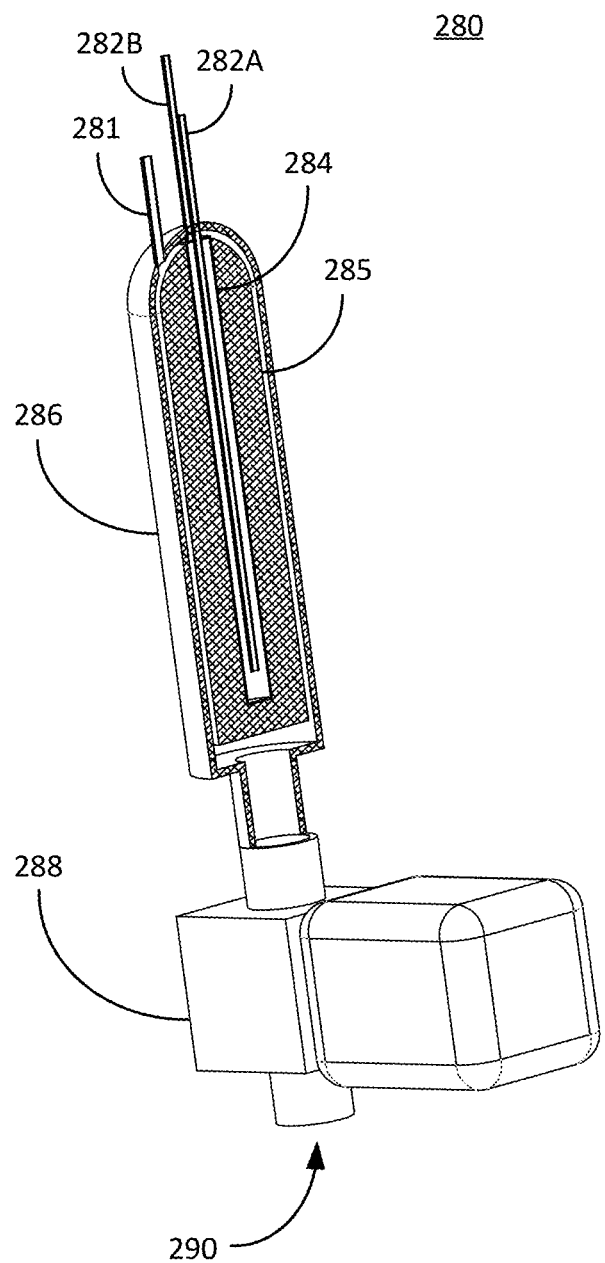
FIG. 5E is a line drawing depicting a cross-section of the receptacle arrangement consistent with embodiments of the present invention.

FIG. 5E is a line drawing depicting a cross-section of the receptacle arrangement 280 consistent with embodiments of the present invention. Each of the segregated gas collecting receptacles 280A-D are connected (via circulation tubes) to the cryogenic feed and return lines 242 and 244, as shown in FIG. 5C. In more detail, the segregated gas collecting receptacle 280 generally comprises a receptacle adsorber 285 (which can be an activated carbon, carbon, zeolite, just to name several porous adsorbers commercially available) housed inside of a receptacle housing 286. The receptacle adsorber 285 can be maintained at cryogenic temperatures, which in certain embodiments uses a liquid helium maintained below 2° C. The liquid cryogen is circulated through the receptacle cryogen reservoir 284 in through a receptacle feed line 282A that is connected to the cryogen feed line 242 and out through a receptacle return line 282B that is connected to the cryogen return line 244. When the receptacle shutoff valve 288 is open, ionized gas is directed (from the split-pole magnets 272) into the receptacle 280 via the receptacle inlet port 290. Upon harvesting the gas 265 trapped in the receptacle adsorber 285, the shutoff valve 288 is closed. One embodiment envisions harvesting the gas 265 trapped in the receptacle 280 by removing the receptacle 280 from the gas separation arrangement 250, such as by a robot or manually. Another embodiment envisions harvesting the gas 265 trapped in the receptacle 280 by heating up the receptacle adsorber 285 via a heater, not shown, connected to or in the receptacle housing 286 and drawing the liberated gas 265 out from an access line 281. The heater causing the gas 265 trapped in the receptacle adsorber 2

Certain other embodiments envision a different adsorber in the receptacle 280, such as a zeolite adsorbing material, which could be used instead of activated carbon in the adsorber 145 in the chamber 240. Zeolites are microporous solids that can be used for gas separation and/or gas collection. While zeolites do occur naturally as minerals, most commercially available zeolite materials today are synthesized in a laboratory. Zeolites are aluminosilicates, comprised of aluminum, silicon, and oxygen with included hydrogen ions or metallic ions such as sodium, calcium, and magnesium. Zeolite crystals exhibit an open cage structure with openings of molecular dimensions (typically measured in Angstroms). Unlike silica gel or activated carbons that usually have irregular pores described by a broad pore size distribution, zeolites have very regular and consistent pore geometry in a very narrow size range. Often, zeolites are called "molecular sieves" because their pores will admit small molecules and bind them while excluding larger molecules that cannot fit into the pores. Zeolites are stable at high temperatures (200° C.-400° C., for example) and so can be regenerated by heating. Heating the zeolite to high temperatures will desorb the trapped gases.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a gas separation arrangement 250 that is generally directed to an ion diverter 251 that is used to segregate and capture the segregated gas from an adsorption gas capturing chamber (chamber) 240. The arrangement can comprise a chamber 240 containing at least a first species of gas. The chamber 240 is connected to an ion diverter 251 via a gas transmission port 252. The ion diverter 251 generally comprises a valve 254 configured to control gas communication between the ion diverter 251 and the chamber 240. The ion diverter 251 includes an ionizer 260 adjacent to the gas transmission port 252, an ion deflector 270 comprising a first magnet plate 272A separated from a second magnet plate 272B by a separation spacing 274 defining a channel 276, and an ion accelerator 265 between the ionizer 260 and the ion deflector 270. A plurality of target receptacles 280 are disposed at an exit location 292 of the channel 276, wherein each target receptacle 280 corresponds to a different target gas. The ionizer 260 is configured to ionize the first species of gas 264A and the second species of gas 264B received from the gas transmission port 252. The ion deflector 270 is configured to direct the ionized first species of gas 264A' in a first controlled trajectory 275A from the ion accelerator 265 to the first target receptacle 280A and the ionized first species of gas 264B' in a second controlled trajectory 275B from the ion accelerator 265 to the second target receptacle 280B.

The gas separation arrangement 250 further imagines the controlled trajectories 275A and 275B being bent or otherwise arced to segregate the two species of gas 265A and 265B.

The gas separation arrangement 250 further envisions the first species of gas 264A being He-3 and the second species of gas 264B being He-4.

The gas separation arrangement 250 further contemplates the first and the second target receptacles 280A and 280B being cooled by liquid cryogen, such as liquid helium.

The gas separation arrangement 250 further envisioning the first and the second target receptacles 280A and 280B each comprising an adsorber 285, that in certain embodiments can be either a carbon adsorber or a zeolite adsorber.

The gas separation arrangement 250 further imagining the first controlled trajectory 275A being different from the second controlled trajectory 275B to separate out the two species of gas 265A and 265B.

The gas separation arrangement 250 can further comprise multiple other species of gas that when ionized comprise other trajectories 275C and 275D that are different than the first controlled trajectory 275A and the second controlled trajectory 275B.

The target receptacles 280A and 280B in the gas separation arrangement 250 are envisioned, in certain embodiments to be removably attached to the gas separation arrangement 250.

Other variations of the gas separation arrangement 250 envision the channel 276 comprising a pressure that is within 3 milli bar from an environment external 102.

Another embodiment of the present invention envisions a gas separator 250 comprising a gas transmission port 252 that is interposed between an ionizer 260 and a chamber 240, wherein the chamber 240 is configured to contain a first species of gas 265A and a second species of gas 265B. Connected to the chamber 240 and ionizer 260 is an ion deflector 270 that comprises a pair of magnetic plates 272, which are separated by a channel 274. There is an accelerator 265 between the ionizer 260 and the ion deflector 270 and a valve 254 configured to control gas communication between the chamber 240 and the ionizer 260. There is a first and a second target receptacle 280A and 280B disposed at a first and a second exit location 292A and 292B, respectively, of the channel 274. The ionizer 260 is configured to ionize the first species of gas 265A that is received from the gas transmission port 252 and further configured to ionize the second species of gas 265B received from the gas transmission port 252. The accelerator 265 is configured to accelerate the ionized first species of gas 265A' and the ionized second species of gas 265B' towards the ion deflector 270. The ion deflector 270 is configured to deflect the ionized first species of gas 265A' in a first curved trajectory 275A between the accelerator 265 and the first target receptacle 280A and is configured to deflect the ionized second species of gas 265B' in a second curved trajectory 275B between the accelerator 265 and the second target receptacle 280B.

The gas separator embodiment 250 is further imagined having the first target receptacle 280A being configured to capture the ionized first species of gas 265A' and the second target receptacle 280A being configured to capture the ionized second species of gas 265B'.

The gas separator embodiment 250 is further imagined having the first curved trajectory 275A being different from the second curved trajectory 275B.

The gas separator embodiment 250 is further imagined wherein the chamber 240 contains four species of gas that comprises at least two additional species of gases in addition to the first species of gas 265A and the second species of gas 265B, the four species of gas including He-3, He-4, H-1 and H-2.

The gas separator embodiment 250 further imagines the first and the second target receptacles 280A and 280B being cooled by liquid helium.

The gas separator embodiment 250 further envisions having the first and the second target receptacles 280A and 280B each comprising an adsorber 285A and 285B. Optionally, each of the adsorbers 285A and 285B can be equipped with either a carbon adsorber or a zeolite adsorber.

The gas separator embodiment 250 further envisions the first and the second target receptacles 280A and 280B being removably attached to the gas separation arrangement 250.

Yet another embodiment of the present invention envisions a gas separator device 250 comprising a gas transmission pathway 255 having a second part 255B and a first part 255A that extends from a chamber 240 through a gas transmission port 252 before reaching an ionizer 260 and ion accelerator 265, after which (the ion accelerator 265) the second part 255B is arched through a magnetic field before terminating at a target receptacle 280. The chamber 240 is configured to contain a first gas species 265A. The ionizer 260 is configured to ionize the first gas species 265A. The accelerator 265 is configured to accelerate the ionized first gas species 265A' towards the magnetic field. The magnetic field is established between a pair of separated magnetic plates 270A and 270B, wherein the magnetic field is configured to bias the ionized first gas species 265A' along the second part 255B to the target receptacle 280A, which is configured to trap the ionized first gas species 265A'.

The gas separator device embodiment 250 can further comprise a second species of gas 265B in the chamber 240. The ion diverter 251 further can comprise a second target receptacle 280B. The ionizer 260 is also configured to ionize the second species of gas 265B received from the gas transmission port 252, wherein the ionized second species of gas 265B' is biased in a different trajectory 275B in the ion deflector 270 than the first species of ionized gas 265A'.

Still another embodiment of the present invention contemplates a method comprising providing a chamber 240 that is connected to an ion diverter 251 as depicted in FIGS. 5A-5C. The method further envisions flowing a first gas species 265A and a second gas species 265B from the chamber 240 to the ion diverter 251 via a gas transmission port 252, followed by ionizing the first gas species 265A and the second gas species 265B in an ionizer 260, followed by accelerating the ionized first gas species 265A' and the ionized second gas species 265B', via an ion accelerator 265, into a magnetic field generated by a pair of spaced apart magnetic plates 272A and 272B. The ionized first gas species 265A' is biased in a first arc 275A, via the magnetic field, to a first target receptacle 280A and the ionized second gas species 265B' is biased in a second arc 275B, via the magnetic field, to a second target receptacle 280B. The ionized first gas species 265A' is directed to and captured in the first target receptacle 280A and the ionized second gas species 265B' is directed to and captured in the second target receptacle 280B.

Another embodiment of the present invention contemplates a gas collection system 100 that generally comprises a gas segregation chamber 110, at least one cooling plate 105 in the gas segregation chamber 110, an adsorption gas capturing chamber 140 connected to the gas segregation chamber 110 and a carbon adsorber 145 in the adsorption gas capturing chamber 140. The gas segregation chamber 110 comprises a housing 115, wherein the housing 115 is defined by housing sides 116 that extend from a top housing surface 118 to a rim 120. A first interior environment 112 is defined within the housing 115, wherein the first interior environment 142 is in communication with an external environment 102 through only the rim 120. The external environment 102 defined outside of the housing 115. At least one cooling plate 105 is in the gas segregation chamber 110, wherein the least one cooling plate 105 comprises a passageway 122 that is configured to accommodate cryogenic fluid. An adsorption gas capturing chamber 140 is connected to the housing 115, wherein the adsorption gas capturing chamber 140 comprises a second interior environment 142 that is in communication with the first interior environment 112 via a connecting port 132. A carbon adsorber 145 is in the second interior environment 142.

The gas collection system 100 further envisions the carbon adsorber 145 being a cartridge that is removable from the gas collection system 100.

The gas collection system 100 further contemplates that the connecting port 132 leads into a connecting passageway 125 that comprises a valve 126 configured to separate the first interior environment 112 from the second interior environment 142 when closed. One embodiment contemplates the valve 126 being a gate valve. Another embodiment contemplates the carbon adsorber 145 being in communication with the gas segregation chamber 110 only when the valve 126 is open.

Another embodiment of the gas collection system 100 contemplates the adsorption gas capturing chamber 140 being removable from the housing 115.

The gas collection system 100 can further comprise a heating element 150 that is configured to heat granular soil 200 under the rim 120 when the rim 120 rests atop the granular soil 200. One embodiment contemplates the heating element 150 being selected from a group consisting of a laser, a radiant heater, an ultrasonic heater, or a microwave heater.

The gas collection system can further comprise a filter 130 being disposed between the at least one cooling plate 105 and the rim 120, the filter 130 is configured to filter non-gaseous material from entering the first interior environment 112 from the external environment 102.

The gas collection system 100 can further comprise a lower valve 190 that when closed seals the at least one cooling plate 105 from the external environment 102.

The gas collection system 100 further imagines the carbon adsorber being an activated carbon adsorber.

The gas collection system can further comprise a heat sink 144 being in contact with the carbon adsorber 145, wherein the heat sink 144 comprises cryogen feed and return lines 148 that are configured to cool the carbon adsorber 145.

The gas collection system 100 can further comprise a pump 158 and a reservoir 160 that is configured to hold cryogenic liquid.

In another aspect of the present invention, some embodiments envision a gas collection arrangement 100 that generally comprises a gas segregation chamber 110, at least one cooling plate 105 in the gas segregation chamber 110, an adsorption gas capturing chamber 140 and a carbon adsorber 145. The gas segregation chamber 110 defines a first interior environment 112 when a rim 120 of the gas segregation chamber 110 rests atop regolith 200. The gas segregation chamber 110 also comprises at least one cooling plate 105 that is configured to capture higher temperature condensing gas but not low temperature condensing gas, wherein the gases are released from the regolith 200. The adsorption gas capturing chamber 140 defines a second interior environment 142 that is in communication with the first interior environment 112 via a connecting port 132. The carbon adsorber 145 is in the second interior environment 142, wherein the carbon adsorber is configured to capture the low temperature condensing gas.

The gas collection arrangement 100 can further comprise a tank 160 that is configured to contain cryogenic liquid to cool the at least one cooling plate 105 to first temperature and the carbon adsorber 145 to a second temperature that is lower than the first temperature.

The gas collection arrangement 100 further envisioning the low temperature condensing gas being helium and the high temperature gas including hydrogen and oxygen.

The gas collection arrangement 100 can further comprise a heat sink 144 that is connected to the carbon adsorber 145, the heat sink 144 configured to cool the carbon adsorber at or below a temperature at which the low temperature condensing gas condenses.

The gas collection arrangement 100 can further comprise a valve 126 that is between the gas segregation chamber 110 and the adsorption gas capturing chamber 140, the valve 126 is configured to cut off the communication between the first interior environment 112 and the second interior environment 142.

Another embodiment of the present invention contemplates a segregating gas arrangement 100 generally comprising a gas segregation chamber 110, at least one cooling plate 105 in the gas segregation chamber 110, at least one cooling plate 105 in the gas segregation chamber 110, and a carbon adsorber 145. The gas segregation chamber 110 comprises a rim 120 that when resting atop regolith 200 defines a first interior environment 112. The at least one cooling plate 105 is in the gas segregation chamber 110, wherein the least one cooling plate 105 is maintained at a first temperature above 5° K, which is a condensation temperature at which higher temperature condensing gases condense. The adsorption gas capturing chamber 140 defines a second interior environment 142 that is in communication with the first interior environment 112. The carbon adsorber 145 is in the second interior environment 142 and is maintained at a second temperature below 3° K. The carbon adsorber is configured to capture the low temperature condensing gas.

The segregating gas arrangement 100 further contemplates the gas segregation chamber 110 being configured to filter out a majority of the higher temperature condensing gases from entering the adsorption gas capturing chamber 140.

Cartain other embodiments of the present invention envision a gas segregating method comprising providing a segregating gas arrangement 100 comprising an adsorption gas capturing chamber 140 that is connected to a gas segregation chamber 110. The gas segregation chamber 110 comprises a housing 115 that is defined by housing sides 116 that extend from a top housing surface 118 to a rim 120. The method further comprises resting the rim 120 atop regolith 200, wherein a first interior environment 112 is defined within the housing when the rim 120 is resting atop the regolith 200. A first temperature above 5° K is maintained in at least one cooling surface 105 that is disposed in the gas segregation chamber 110 and a second temperature below 3° K is maintained at the carbon adsorber 145 in the second interior environment 142. A majority of higher temperature condensing gases are condensed in the first interior environment 112 but not a lower temperature condensing gas is not condensed in the first interior environment 112. The lower temperature condensing gas is captured in a carbon adsorber 145 that is located in the adsorption gas capturing chamber 140, wherein the lower temperature condensing gas migrates from the first interior environment 112 to a second interior environment 142 that is defined within the adsorption gas capturing chamber 140.

The gas segregating method can further comprise a step for removing the adsorption gas capturing chamber 140 from the gas segregation chamber 110.

The gas segregating method can further comprise a step for circulating cryogenic fluid through the at least one cooling surface 105 and through a heat sink 144 that is in contact with the carbon adsorber 145, the cryogenic fluid is held in a reservoir 160 of the segregating gas arrangement 100.

The gas segregating method can further comprise a step for removing the carbon adsorber 145 from the segregating gas arrangement 100.

The gas segregating method can further comprise a step for liberating the higher temperature condensing gases and lower temperature condensing gas from the regolith 200 by heating the regolith with a heater 150 that is cooperating with the segregating gas arrangement 100.

The gas segregating method further envisions the at least one cooling surface 105 being a cooling plate.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the cooling surfaces 105 and heat sink 145 can be different but serve the same purpose without departing from the scope and spirit of the present invention. It should further be appreciated that the valves do not need to be gate valves but could be other valve construction including more than one valve, the basic construction is well known in the art and modification to present embodiments discussed can be made once a skilled artisan is in possession of the concepts disclosed herein. Moreover, the electronics and computing that enable the functionality of the gas collection system 100 are not described in detail because the electronics and computing elements either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A gas separation arrangement comprising: a chamber comprising a first species of gas and a second species of gas;
an ion diverter connected to the chamber via a gas transmission port;
a valve configured to control gas communication between the ion diverter and the chamber, wherein the ion diverter comprises
an ionizer adjacent to the gas transmission port,
an ion deflector comprising a first magnet plate separated from a second magnet plate by a separation spacing defining a channel,
an ion accelerator between the ionizer and the ion deflector; and a first and a second target receptacle disposed at an exit location of the channel, wherein the ionizer is configured to ionize the first species of gas and the second species of gas received from the gas transmission port, and the ion deflector is configured to direct the ionized first species of gas in a first controlled trajectory from the ion accelerator to the first target receptacle and the ionized second species of gas in a second controlled trajectory from the ion accelerator to the second target receptacle.

2. The gas separation arrangement of claim 1, wherein the controlled trajectories are bent.

3. The gas separation arrangement of claim 1, wherein the first species of gas is He-3 and the second species of gas is He-4.

4. The gas separation arrangement of claim 1, wherein the first and the second target receptacles and are cooled by liquid cryogen.

5. The gas separation arrangement of claim 1, wherein the first and the second target receptacles each comprise an adsorber.

6. The gas separation arrangement of claim 5, wherein the adsorber is either a carbon adsorber or a zeolite adsorber.

7. The gas separation arrangement of claim 1, wherein the first controlled trajectory is different from the second controlled trajectory.

8. The gas separation arrangement of claim 1, further comprising multiple other species of gas that when ionized comprise other trajectories that are different than the first controlled trajectory and the second controlled trajectory.

9. The gas separation arrangement of claim 1, wherein the target receptacles are removably attached to the gas separation arrangement.

10. The gas separation arrangement of claim 1, wherein the channel comprises a pressure that is within 3 milli bar from an environment external.

11. A gas separator comprising:

a gas transmission port interposed between an ionizer and a chamber, the chamber configured to contain a first species of gas and a second species of gas;

an ion deflector comprising a pair of magnetic plates separated by a channel;

an accelerator between the ionizer and the ion deflector;

a valve configured to control gas communication between the chamber and the ionizer;

a first and a second target receptacle disposed at a first and a second exit location, respectively, of the channel, the ionizer configured to ionize the first species of gas received from the gas transmission port and ionize the second species of gas received from the gas transmission port;

the accelerator configured to accelerate the ionized first species of gas and the ionized second species of gas towards the ion deflector, the ion deflector configured to deflect the ionized first species of gas in a first curved trajectory between the accelerator and the first target receptacle and to deflect the ionized second species of gas in a second curved trajectory between the accelerator and the second target receptacle.

12. The gas separator of claim 11, wherein the first target receptacle is configured to capture the ionized first species of gas and the second target receptacle is configured to capture the ionized second species of gas.

13. The gas separator of claim 11, wherein the first curved trajectory is different from the second curved trajectory.

14. The gas separator of claim 11, wherein the chamber contains four species of gas comprising at least two additional species of gases in addition to the first species of gas and the second species of gas, the four species of gas include He-3, He-4, H-1 and H-2.

15. The gas separator of claim 11, wherein the first and the second target receptacles and are cooled by liquid helium.

16. The gas separator of claim 11, wherein the first and the second target receptacles and each comprise an adsorber.

17. The gas separator of claim 16, wherein each of the adsorbers is either a carbon adsorber or a zeolite adsorber.

18. The gas separator of claim 11, wherein the first and the second target receptacles are removably attached to the gas separation arrangement.

19. A gas separator device comprising:

a gas transmission pathway comprising a second part and a first part that extends from a chamber through a gas transmission port before reaching an ionizer and ion accelerator, after which the second part is arched through a magnetic field before terminating at a target receptacle, the chamber configured to contain a first gas species, the ionizer configured to ionize the first gas species, the accelerator configured to accelerate the ionized first gas species, the magnetic field established between a pair of separated magnetic plates, the magnetic field configured to bias the ionized first gas species along the second part to the target receptacle, which is configured to trap the ionized first gas species.

20. The gas separator device of claim 19 further comprising a second species of gas in the chamber, and wherein the ion diverter further comprising a second target receptacle, the ionizer is configured to ionize the second species of gas received from the gas transmission port, the ionized second species of gas biased in a different trajectory in the ion deflector than the first species of ionized gas.

21. A method comprising:

providing a chamber that is connected to an ion diverter;

flowing a first gas species and a second gas species from the chamber to the ion diverter via a gas transmission port;

ionizing the first gas species and the second gas species in an ionizer;

accelerating the ionized first gas species and the ionized second gas species, via an ion accelerator, into a magnetic field generated by a pair of spaced apart magnetic plates; and biasing the ionized first gas species in a first arc, via the magnetic field, to a first target receptacle and the ionized second gas species in a second arc, via the magnetic field, to a second target receptacle;

capturing the ionized first gas species in the first target receptacle and capturing the ionized second gas species in the second target receptacle.

* * * * *